(12) United States Patent
Tsutsumi et al.

(10) Patent No.: US 8,000,298 B2
(45) Date of Patent: Aug. 16, 2011

(54) FAST ROAMING SYSTEM

(75) Inventors: Takayuki Tsutsumi, Kawasaki (JP); Yoshikazu Kobayashi, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 2867 days.

(21) Appl. No.: 10/648,277

(22) Filed: Aug. 27, 2003

(65) Prior Publication Data

US 2004/0043767 A1    Mar. 4, 2004

(30) Foreign Application Priority Data

Aug. 28, 2002    (JP) ................ 2002-248889

(51) Int. Cl.
*H04W 4/00* (2009.01)
(52) U.S. Cl. ..... 370/331; 370/328; 370/338; 455/432.1; 455/436
(58) Field of Classification Search .............. 370/333, 370/310, 331, 332, 350, 338, 310.2, 32; 455/437, 455/436
See application file for complete search history.

(56) References Cited

U.S. PATENT DOCUMENTS

| | | | |
|---|---|---|---|
| 4,765,753 A | 8/1988 | Schmidt | |
| 5,790,536 A * | 8/1998 | Mahany et al. | 370/338 |
| 5,864,578 A * | 1/1999 | Yuen | 375/143 |
| 5,875,186 A | 2/1999 | Belanger et al. | |
| 6,088,591 A * | 7/2000 | Trompower et al. | 455/438 |
| 6,393,282 B1 * | 5/2002 | Iimori | 455/432.1 |
| 6,516,196 B1 * | 2/2003 | Chen et al. | 455/450 |
| 6,917,804 B2 * | 7/2005 | Takayama et al. | 455/432.1 |
| 6,985,465 B2 * | 1/2006 | Cervello et al. | 370/333 |
| 2001/0046879 A1 * | 11/2001 | Schramm et al. | 455/525 |
| 2002/0025810 A1 * | 2/2002 | Takayama et al. | 455/432 |
| 2002/0154623 A1 * | 10/2002 | Hundemer | 370/349 |
| 2003/0123405 A1 * | 7/2003 | del Prado et al. | 370/331 |
| 2004/0063426 A1 * | 4/2004 | Hunkeler | 455/426.1 |

FOREIGN PATENT DOCUMENTS

| | | |
|---|---|---|
| EP | 1 172 969 A2 | 1/2002 |
| JP | 7-222245 A | 8/1995 |
| JP | 8-265322 A | 10/1996 |
| JP | 11-298937 | 10/1999 |
| JP | 2000-295650 A | 10/2000 |
| JP | 2000-299886 A | 10/2000 |
| JP | 2001-274816 A | 10/2001 |
| JP | 2001-298467 A | 10/2001 |
| JP | 2002-26931 A | 1/2002 |
| JP | 2002-101438 | 4/2002 |
| KR | 2002 023 918 A | 3/2002 |

* cited by examiner

*Primary Examiner* — Andrew Chriss
(74) *Attorney, Agent, or Firm* — Sughrue Mion, PLLC

(57) ABSTRACT

A fast roaming system for changing, in a short period of time, the connection to a roaming destination AP (access point) providing a better communication environment, and for improving a roaming completion rate. In response to a search process performed by a mobile terminal, individual APs transmits AP data required for roaming directly to the mobile terminal. The mobile terminal performs the passive scanning search or the active scanning search for the peripheral APs at short time intervals, and obtains and stores the latest AP data in an AP data table. As a result, only the latest data for the connectable peripheral AP can be stored as a roaming destination in the AP data table. Furthermore, since the order condition is set by the mobile terminal to select the roaming destination AP, there is a high probability that the roaming is completed when the peripheral AP is first selected. Therefore, only a short period of time is required until the roaming is completed.

29 Claims, 21 Drawing Sheets

| AP DATA TABLE | | | | |
|---|---|---|---|---|
| ROAMING ORDER | MAC ADDRESS OF AP | TIME STAMP | WIRELESS CHANNEL | SSID |
| 1 | XX.XX.XX.XX.XX.01 | XX.XX.02 | 1 | AP1 |
| 2 | XX.XX.XX.XX.XX.11 | XX.XX.07 | 9 | AP1 |
| ⋮ | | | | |

| AP DATA TABLE | | | | | |
|---|---|---|---|---|---|
| ROAMING ORDER | MAC ADDRESS OF AP | TIME STAMP | WIRELESS CHANNEL | SSID | RECEPTION LEVEL |
| 1 | XX.XX.XX.XX.XX.11 | XX.XX.07 | 9 | AP1 | 100% |
| 2 | XX.XX.XX.XX.XX.01 | XX.XX.02 | 1 | AP1 | 70% |
| ⋮ | | | | | |

155-G

| PARENT STATION AP RECEPTION LEVEL TABLE | | | |
|---|---|---|---|
| MANAGEMENT NUMBER | BSSID | TIME STAMP | RECEPTION LEVEL |
| 1 | XX.XX.XX.XX.XX.01 | XX.XX.18 | 55% |
| 2 | XX.XX.XX.XX.XX.01 | XX.XX.13 | 60% |
| 3 | XX.XX.XX.XX.XX.01 | XX.XX.10 | 70% |
| 4 | XX.XX.XX.XX.XX.01 | XX.XX.07 | 90% |
| 5 | XX.XX.XX.XX.XX.01 | XX.XX.05 | 70% |
| 6 | XX.XX.XX.XX.XX.01 | XX.XX.02 | 100% |
| ⋮ | | | |

FIG. 17

Dx : FRAME TRANSMITTED FROM AP

Ux : FRAME TRANSMITTED FROM POLLED MOBILE TERMINAL poll : POLLING ack : ACKNOWLEGE
(ACKNOWLEGE RESPONSE TO RECEIVED SIGNAL)

| BEACON TIMING TABLE ||
|---|---|
| CHANNEL NUMBER | ADDITIONAL TIME TO REFERENCE TIME |
| 1 | 0 |
| 2 | + 5 ms |
| 3 | + 10 ms |
| 4 | + 15 ms |
| ⋮ | |

FAST ROAMING SYSTEM

BACKGROUND OF THE INVENTION

The present invention relates to a fast roaming system whereby a mobile terminal, while communicating with an access point, serving as a parent station, over a wireless LAN that conforms to the IEEE 802.11 specifications developed by the Institute of Electrical & Electronics Engineers (IEEE), can be quickly switched from the parent station to an adjacent access point having an overlapping communication range. The present invention relates in particular to a fast roaming system wherein, without communication being interrupted, a roaming destination access point providing better environmental conditions can be selected and a roaming completion ratio improved, and wherein a fast roaming operation can be effectively performed under a variety of conditions.

Generally, the IEEE 802.11 specifications, which constitute a well known wireless LAN technique, are typically applied for a wireless LAN.

There are two types of wireless LANs: one is a so-called AdHoc or independent connection network wherein mobile terminals are interconnected; and another is an infrastructure connection network wherein multiple mobile terminals are connected to an access point (hereinafter referred to simply as an AP) that serves as a parent station, and communicate with each other through the parent station.

In the environment inherent to an infrastructure connection network, wherein either multiple APs are adjacently located or the AP communication zones differ, the connection of a mobile terminal, which is moving during the communication process, must be transferred from a parent station AP to which currently connected to another peripheral AP. In general, the roaming system of the invention can be applied for the switching of AP connections, including switching between communication providers. For convenience, during the explanation of this invention, an AP currently connected to a mobile terminal is called a parent station AP, and an AP for which AP information can be obtained by performing an AP search, i.e., a searchable AP, is called a peripheral AP.

For a roaming operation, a process called scanning is employed to find a roaming destination AP by examining connectable peripheral APs.

To perform this scanning process, two methods are available. According to the first, a passive scanning operation is performed to receive a beacon (synchronization) signal that is periodically transmitted by an AP in order to synchronize mobile terminals with the AP. And according to the second, an active scanning operation is performed wherein a mobile terminal transmits a search packet, called a probe, to an unspecified AP and receives a response packet in return.

Generally, for roaming, the active scanning operation is performed for all, or for predesignated, wireless channels, and based on a response, a peripheral roaming destination AP is selected as the next parent station AP.

In accordance with the well known IEEE 802.11b specifications, in Japan, fourteen channels are employed in a frequency band ranging from 2.412 GHz to 2.483 GHz. Thus, when an active scanning operation, or a passive scanning operation, is performed to select a peripheral AP, a search must be made of all fourteen channels, or of predesignated channels.

During a roaming operation, when a mobile terminal is moved and the reception level for the currently connected parent station AP falls below a predetermined threshold value, passive scanning is performed to determine whether other connectable APs are present in the vicinity. When connectable peripheral APs are found, a reassociation request is issued to the one providing the highest reception level, and the mobile terminal is connected to this AP, as the new parent station AP. The roaming operation is thus completed.

Further, according to the IEEE 802.11 specifications, roaming standardization is performed for specifying the procedures whereby, when the roaming operation has been completed, the destination parent station AP notifies other APs that the mobile terminal has performed the roaming operation.

Conventionally, this type of fast roaming system is disclosed in JP-A-2001-94572 or JP-A-2002-26931, for example.

This system will now be described while referring to FIG. 1. A parent station AP 102-A, to which a station, a mobile terminal 101, is connected, fetches over a LAN 5 hopping data for APs 102-B and 102-C and stores these data. Similarly, the other APs 102 connected to the LAN 5 also fetch the hopping data for the other APs 102 over the LAN 5 and store these data. Therefore, the mobile terminal 101 can download, from the connected parent station AP 102-A, the hopping data for the peripheral APs 102-B and 102-C. That is, based on the hopping data for the peripheral APs 102-B and 102-C, which are obtained from the parent station AP 102-A, the mobile terminal 101 can store the latest wireless communication states of the peripheral APs 102-B and 102-C in a database.

On the other hand, the mobile terminal 101 may examine the quality of a beacon signal received from the parent station AP 102-A, and begin the roaming operation when the quality falls below a predetermined threshold value.

While referring to FIG. 2 as well as FIG. 1, before beginning the roaming operation, the mobile terminal 101 examines a database (step S101) to determine whether the latest wireless communication states of the peripheral APs 102-B and 102-C have been obtained from the parent station AP 102-A and stored.

When the decision is YES at step S101, i.e., the data are present in the database, the communication states in the database are compared (step S102), and a peripheral AP providing the best wireless environment, e.g., the AP 102-C, is selected and the roaming operation is performed (step S103). When the roaming operation has been completed (YES at step S104), the processing is terminated thereafter.

When the decision at step S101 is NO and the wireless communication states of the peripheral APs have not been obtained, based on the hopping data, the mobile terminal 101 scans the channels for all the APs (step S105) and obtains their wireless environments, and program control is shifted to step S103. When the decision is NO at step S104 and the roaming operation has not yet been completed, program control is returned to step S103 for the selection of the one of the remaining APs that provides the best wireless environment.

With this configuration, according to JP-A-2001-94572, when the roaming operation start condition has been established, the mobile terminal employs the downloaded data to directly provide synchronization with the peripheral APs, and performs a roaming operation to select the AP having the largest RSSI (Received Signal Strength Index). According to JP-A-2002-26931, the mobile terminal examines the obtained data to select the AP providing the best wireless environment.

With this configuration, before starting the roaming operation, the mobile terminal obtains, from a parent station AP, the hopping data for the peripheral APs or received signals, and compares these data to select the AP providing the best wireless environment, and then performs the roaming operation. Therefore, the roaming speed can be increased.

In the conventional fast roaming system described above, a currently connected parent station AP receives, from peripheral APs, information to serve as a database for the selection of a roaming destination AP, and this information is only periodically fetched by the mobile terminal. Thus, the available information tends not to be current. Accordingly, it is unfavorable that, for the mobile terminal, the database contents used when selecting a roaming destination AP frequently differ from the current ones.

Further, in the conventional fast roaming system described above, the AP data collected by each AP is limited to that for APs located around the periphery of the pertinent AP and that the thus collected data include no condition information that indicate whether a mobile terminal can be connected. Therefore, it is unfavorable that there is high probability that a connection-disabled AP will be selected as a roaming destination AP by the mobile terminal.

SUMMARY OF THE INVENTION

To resolve these problems, it is one objective of the present invention to provide a fast roaming system for selecting a roaming destination AP providing a better operating environment within a sort period of time, and for increasing the roaming completion ratio.

According to the present invention, a fast roaming system is a system whereby a mobile terminal while communicating with an access point, serving as a parent station, over a wireless LAN that conforms to the IEEE 802.11 specifications, can be quickly switched from the parent station to an adjacent access point having an overlapping communication range.

Specifically, the basic configuration of the access point of the invention comprises: a wireless LAN interface for communicating with the mobile terminal over the wireless LAN; a roaming unit for performing a roaming operation based on the IEEE 802.1113 specifications; a beacon unit for transmitting a beacon signal to provide synchronization with the mobile terminal; and a data transmitter for transmitting, to the mobile terminal, access point data required for the roaming operation.

The basic configuration of the mobile terminal comprises: a wireless LAN interface for communicating with an access point over the wireless LAN; an access point search unit for searching for peripheral connectable access points and for obtaining access point data; a roaming unit for transferring the connection of the mobile terminal from a currently connected access point to another, designated access point; an access point data table in which the access point data detected and obtained by the access point search unit are recorded; and a function controller for, when a condition for communicating with the current access point matches a predetermined roaming operation start condition, employing a predetermined order sequence to select one of the access points entered in the access point data table, and for driving the roaming unit to perform the roaming operation for the access point that is selected.

With this configuration, the mobile terminal can obtain the access point data not only from the parent station access point, but also from the peripheral connectable access points by directing that these points be accessed. Therefore, the latest data for the connectable access points are stored as current data in the database, and when the roaming operation is begun the mobile terminal can employ the latest data in the database. Further, since the data are obtained from the connectable access point, a high roaming operation completion ratio is obtained relative to the roaming destination access point that is selected based on the database contents.

A random order sequence may be used; however, in this invention, the order for the roaming access points is provided for the mobile terminal for the selection of an access point from the access point data table. The roaming operation order for the access points can be entered in the access point data table. And therefore, the function controller can repetitively perform the roaming operation in this order, and can sequentially select the roaming destinations until the roaming operation is completed.

According to the above described fast roaming system, further, the access point selects at least either the number of mobile terminals connected to an access point, an error ratio for data transmitted and received between this access point and the mobile terminals connected, or a communication ratio for the communication band of this access point. The data transmitter records the selected data in the database, and transmits the data in the database to the mobile terminal.

Therefore, in the mobile terminal, the access point search unit enters the received data in the access point data table, and the function controller sets the roaming order based on the data in the access point data table. The roaming order is set beginning with the AP having the highest reception level, the AP having the smallest number of connected mobile terminals, or the AP having the a lowest error ratio.

In addition, the mobile terminal may record either all the data for the number of mobile terminals, the error ratio and the communication ratio, or the selected data; may aggregate the recorded data based on weights predesignated for individual entries; and may set the roaming order to begin with the AP having the smallest data sum.

In addition to the basic configuration, the reception levels of wireless signals received from the currently connected parent station access point are monitored and are sequentially recorded, at predetermined times, in a parent station reception level table, while the levels of the received wireless signals are compared with past reception levels. When the number of compared signals is counted by a counter for comparison, and the comparison result is continuously reduced to a predetermined count, this condition can be defined as one of the roaming operation start conditions employed by the mobile terminal.

Further, the reception level of the wireless signal obtained through the search performed by the access point search unit is compared with the level of the signal received from the connected parent station. When the reception level of the wireless signal obtained through the search performed by the access point search is equal to or higher than a predetermined threshold value, this condition can be defined as another roaming operation start condition.

Furthermore, the error ratio is received from the data transmitter of the currently connected parent station and is recorded, and when the error ratio is higher than a predetermined error ratio, this condition can be defined as an additional roaming operation start condition.

In addition, after the access point search unit of the mobile terminal has obtained the end of a contention-free period included in the beacon signal and the probe response, the access point search unit can initiate a search during a period excluding the data transmission (transmitting and receiving) period for the mobile terminal.

In addition to the basic configuration of the invention, one selected access point can be located as a master parent station for transmitting a synchronized packet. This master access point has the above described configuration of the access point at which is additionally included a synchronized packet transmitter for transmitting, to another access point, a synchronized packet that is synchronized with a beacon signal transmitted by the master access point. Accordingly, each of the other access points includes: a synchronized packet receiver for receiving the synchronized packet; and a beacon transmitter for defining, as a reference time, the reception time for the synchronized packet, and for, after a predetermined time has elapsed following the reception of the reference time, transmitting a beacon signal for each ratio channel, without overlapping a beacon signal from another access point.

Moreover, the access point search unit of the mobile terminal comprises: a passive scanner for receiving a beacon signal and for searching for an access point; and a beacon table, in which the correlation between a wireless channel and a beacon transmission time is recorded, wherein the passive scanner can perform the passive scanning at the time recorded in the beacon table, excluding the time whereat the mobile terminal is transmitting and receiving data. In addition, the mobile terminal further comprises: an active scanner for examining an access point from which a response is received relative to a search packet that the access point search unit has transmitted to the access point, wherein, when the passive scanner fails to obtain the access point through passive scanning, the active scanner performs the active scanning.

As described above, the fast roaming system of the invention, wherein a search for the access points is not performed during the roaming operation, comprises a variety of units that can rapidly and exactly perform the selection of an access point providing a better wireless environment and the connection of the access point at a higher roaming completion ratio.

BRIEF DESCRIPTION OF THE DRAWINGS

FIG. 17 is a diagram showing the contents of the AP reception level table of the mobile terminal in FIG. 16;

DETAILED DESCRIPTION OF THE PREFERRED EMBODIMENT

The preferred embodiment of the present invention will now be described while referring to the accompanying drawings. In these drawings, the functional blocks according to the present invention are simplified and shown to help in the understanding of the explanation.

Figure 3:
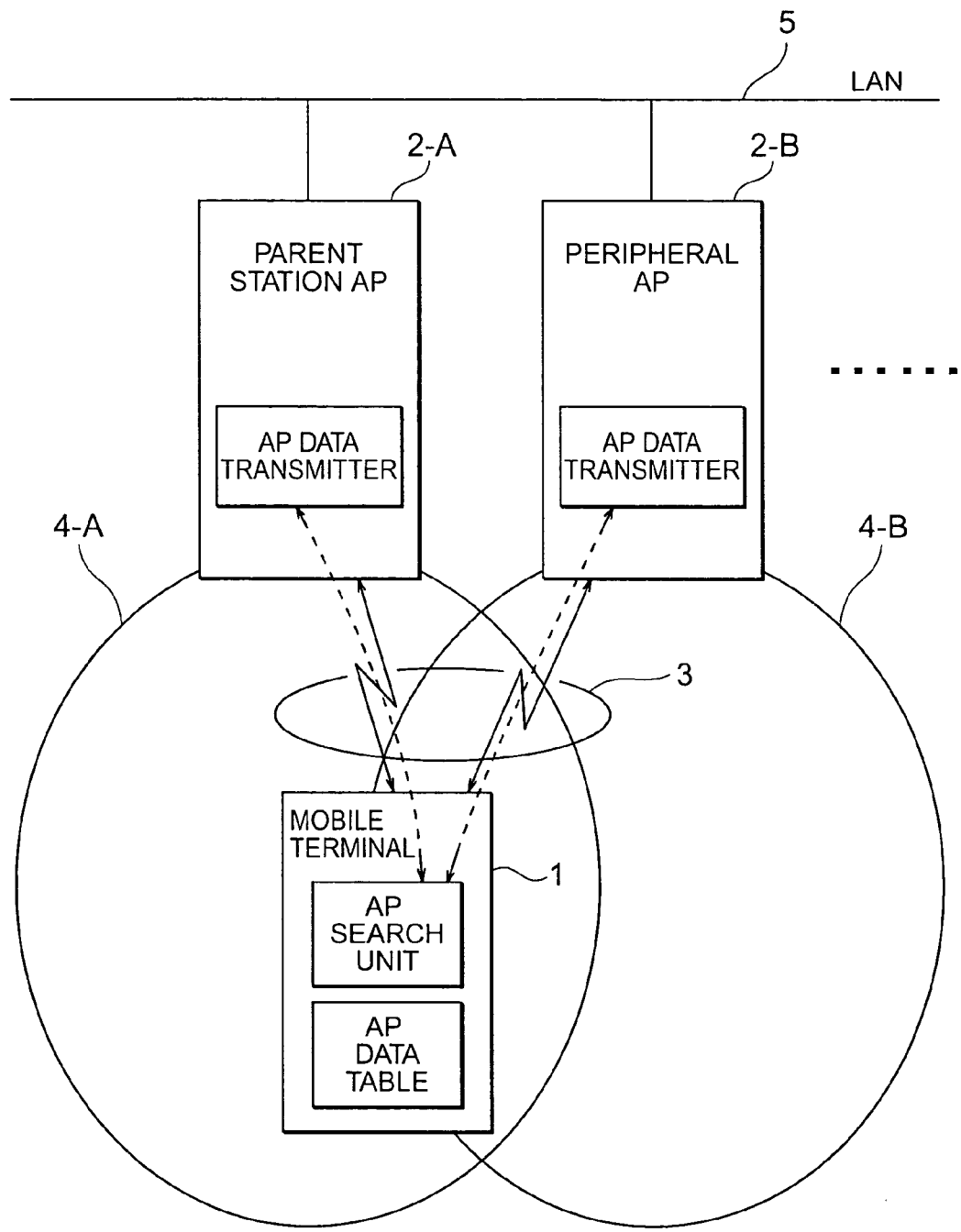
FIG. 3 is a diagram showing a system configuration according to one embodiment of the present invention.

FIG. 3 is a basic diagram showing the connection of functional blocks according to one embodiment of the present invention. A fast roaming system in FIG. 3 includes a mobile terminal 1, access points (hereinafter referred to simply as APs) 2 including a parent station AP 2-A, and peripheral APs 2-B, . . . , for which communication areas 4 overlap. The mobile terminal 1 is a mobile terminal for communication. The parent station AP 2-A is currently communicating with the mobile terminal 1. The peripheral APs 2-B, . . . , are located near the mobile terminal 1. More than one of these components is provided, and for the mobile terminal 1, the type is not limited to that of a mobile terminal.

The mobile terminal 1 communicates with the parent station AP 2-A and the peripheral APs 2-B, . . . over a wireless LAN 3 that conforms to the IEEE 802.11 specifications. The parent station AP 2-A and the peripheral APs 2-B, . . . , include communication areas 4-A, 4-B, . . . , respectively, which overlap each other relative to the mobile terminal 1. Further, a LAN 5 such as the ethernet (TM) is employed between the parent AP 2-A and the peripheral APs 2-B, . . . However, another LAN system, such as the above-described wireless LAN, may also be employed as for the LAN 5.

Each of the APs 2 includes a function for bridging a wireless LAN 3 and the LAN 5, so that data can be directly transmitted and received between the LAN 5 and the mobile terminal 1. This bridging is also not limited to the bridging between the wireless LAN 3 and the LAN 5, and may be employed between wireless LANs 3, as in the above-described case wherein the APs 2 are connected across the wireless LAN 3.

A difference between the fast roaming system in FIG. 3 and the conventional system is that the APs 2 can at least transmit AP data required for the roaming operation to the mobile terminal 1 along predetermined channels, and that the mobile terminal 1 searches for the APs 2 and fetches the AP data, and stores the AP data in an AP data table for employment for roaming. That is, the mobile terminal 1 fetches the AP data only for peripheral connectable APs, and stores them.

Figure 4:
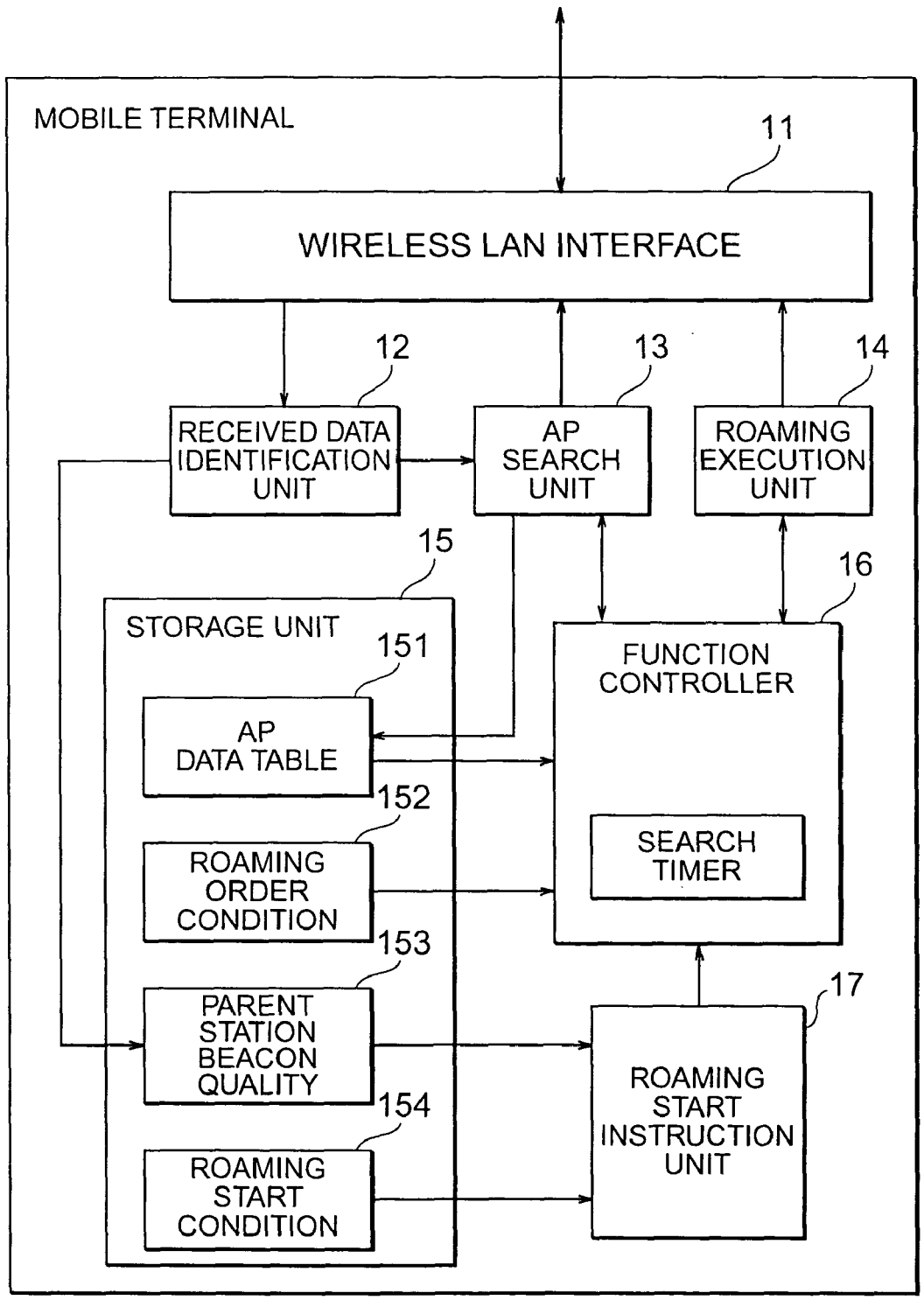
FIG. 4 is a diagram showing the functional block arrangement of a mobile terminal in FIG. 3 according to the embodiment of the invention.

The arrangement of the mobile terminal 1 will now be described while referring to FIG. 4, in addition to FIG. 3.

The mobile terminal 1 comprises a wireless LAN interface 11, a received data identification unit 12, an AP search unit 13, a roaming execution unit 14, a storage unit 15, a function controller 16 and a roaming start instruction unit 17. The storage unit 15 includes, as a database, an AP data table 151, an area for a roaming order condition 152, an area for a parent station beacon quality 153 and an area for a roaming start condition 154.

The wireless LAN interface 11 performs wireless LAN communication in accordance with the well known IEEE 802.11 specifications, advocated by the Institute of Electrical & Electronics Engineers (IEEE), and is driven for accessing the AP 2 through the wireless LAN 3.

The received data identification unit 12 identifies a beacon signal and AP data received from a communication capable AP, and transmits beacon quality data received from the parent station AP 2-A to the parent station beacon quality 153 area and the AP data received from the peripheral APs 2-B, . . . , to the AP search unit 3.

Under the control of the function controller 16, the AP search unit 13 performs, through the wireless LAN interface 11, the active scanning process and the passive scanning process that are defined by the well known IEEE 802.11 specifications, and receives the AP data from the received data identification unit 12 and updates the data entered in the AP data table 151. During the active scanning process, the AP search unit 13 transmits a search packet to search for the peripheral APs 2-B, . . . , and receives response packets from these peripheral APs, so that the AP data for a connectable peripheral AP can be obtained. During the passive scanning process, the AP search unit 13 receives beacon signals from the peripheral APs 2-B, . . . , the APs other than the currently connected parent station AP 2-A, and obtains the AP data for the connectable peripheral APs 2-B, . . .

Under the control of the function controller 16, before starting the roaming, the roaming execution unit 14 transmits a predetermined wireless packet to the peripheral AP 2-B, for example, over the wireless LAN interface 11. It should be noted that the roaming operation performed by the roaming unit 1 is defined by the IEEE 802.11 specifications.

The storage unit 15 is used to record the basic data and the latest data. Stored in the AP data table 151 are the latest data for the roaming-enabled peripheral APs 2-B, . . . , which are received from the AP search unit 13 periodically or at a predetermined time. The AP data include a MAC (Media Access Control) address, a wireless channel and an SSID (Service Set Identifier), all of which are basic data for the AP 2. However, the data stored in the AP data table 151 are not limited to these data, and a reception level, the number of currently connected mobile terminals, an error ratio, a communication ratio and the roaming order may be entered in the AP data table 151.

A predetermined order condition, wherein the function controller 16 selects a roaming destination AP 2 during the roaming operation, e.g., a random selection of the peripheral AP from among those entered in the AP data table 151, is stored in the roaming order condition 152 area. The beacon quality received from the parent station AP 2-A is stored, through the received data identification unit 12, in the parent station beacon quality 153 area. The roaming start condition is stored in advance in the roaming start condition 154 area. For example, when the beacon quality received from the parent station AP 2-A is equal to or lower than a threshold value that is stored in advance, this time can be set as the roaming start time.

The function controller 16 is connected to the individual functional blocks of the mobile terminal 1, and executes a necessary function of the mobile terminal 1. While a temporary memory required for this control process is incorporated in the function controller 16, a program memory may be incorporated in the function controller 16 or may be stored in the storage unit 15.

The roaming start instruction unit 17 examines the data stored in the storage unit 15, and when a condition matching the roaming start condition 154 is found, instructs the function controller 16 to start the roaming operation. For example, when the beacon quality threshold value is present, in the storage unit 15, as the roaming start condition 154, the roaming start instruction unit 17 compares the data in the parent beacon quality 153 with this threshold value. And when the quality is lower than the threshold value, the roaming start instruction unit 17 instructs the function controller 16 to start the roaming operation.

Figure 5:
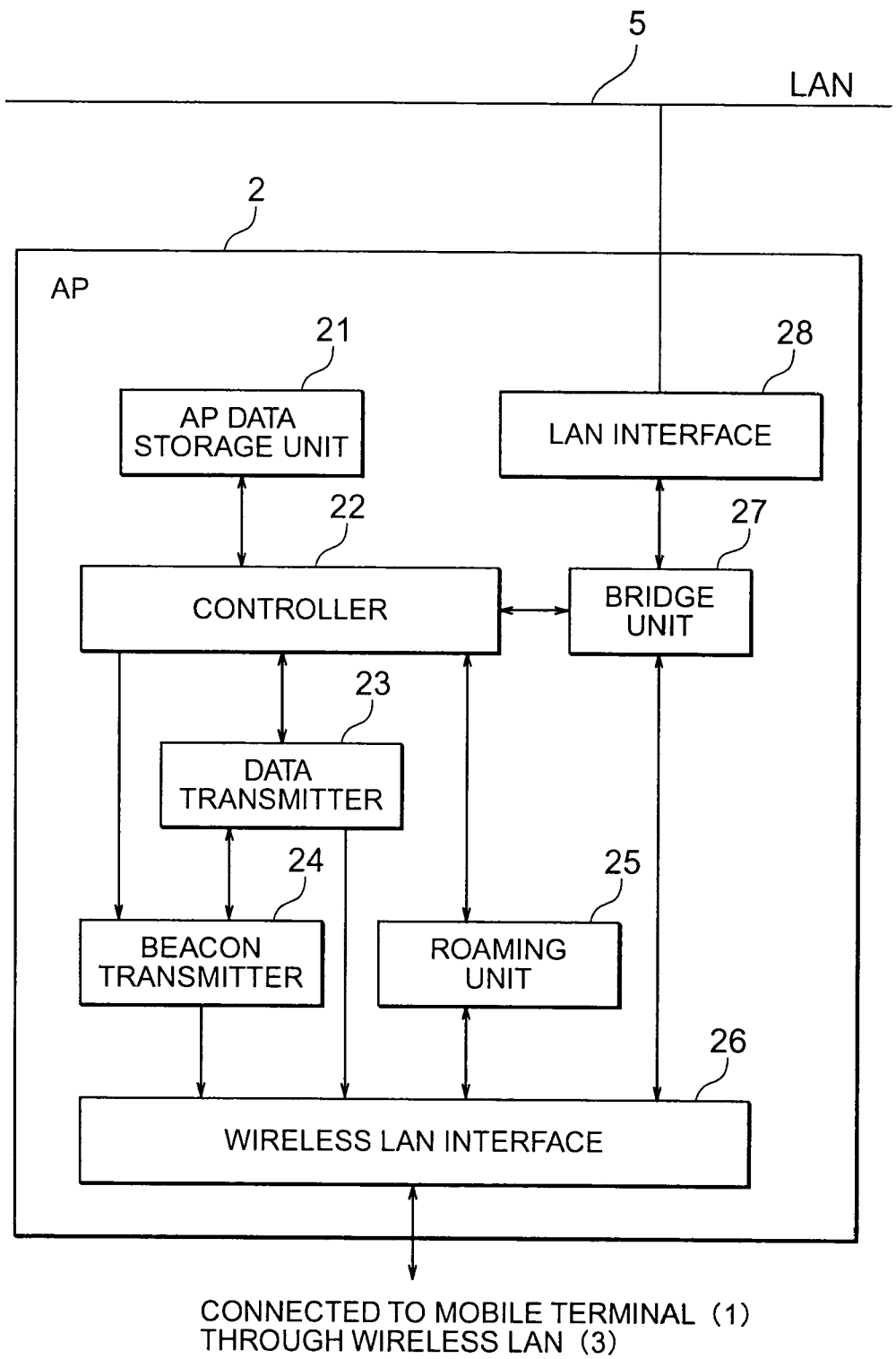
FIG. 5 is a diagram showing the functional block arrangement of an AP in FIG. 3 according to the embodiment of the invention.

The arrangement of the AP 2 will now be described while referring to FIG. 5, in addition to FIG. 3. FIG. 5 is a block diagram showing the arrangement used in common by all the APs, including the parent station AP 2-A and the peripheral APs 2-B, . . . For the convenience of the explanation, of the components of the AP 2, the functional blocks that are not related to the invention are not shown.

The AP 2 in FIG. 5 includes an AP data storage unit 21, a controller 22, an AP data transmitter 23, a beacon transmitter 24, a roaming unit 25, a wireless LAN interface 26, a bridge unit 27 and a LAN interface 28.

The AP data storage unit 21 is used to store the above-described AP data for each AP 2.

The controller 22 is connected to the functional blocks of the AP 2 to execute necessary functions of the AP 2. A detailed description for this will be included in the following explanation for the functional blocks.

The AP data transmitter 23 receives a "probe request", which is a search packet defined by the IEEE 802.11 specifications, from the mobile terminal 1 through the wireless LAN interface 26. At this time, the AP data transmitter 23 extracts the own AP data through the controller 22 from the AP data storage unit 21, and transmits the AP data with a "probe response", which is a response packet relative to the "probe request".

Under the control of the controller 22, the beacon transmitter 24 periodically transmits a beacon signal conforming to the IEEE 802.11 specifications.

Under the control of the controller 22, during the roaming operation, control packets are transmitted and received between the roaming unit 25 and the mobile terminal 1 through the wireless interface 26.

The LAN interface 26 is used for wireless LAN communication with the AP 2 in accordance with the IEEE 802.11 specifications, and is driven to access the mobile terminal 1 over the wireless LAN 3.

The bridge unit 27 functions as a bridge when the mobile terminal 1 is connected through the pertinent AP 2 and the LAN 5 to another AP 2 or a communication terminal to perform communication.

The LAN interface 28 is driven when another AP or a communication terminal is to be accessed over the LAN 5 in accordance with the specifications that match the LAN 5.

Figure 1:
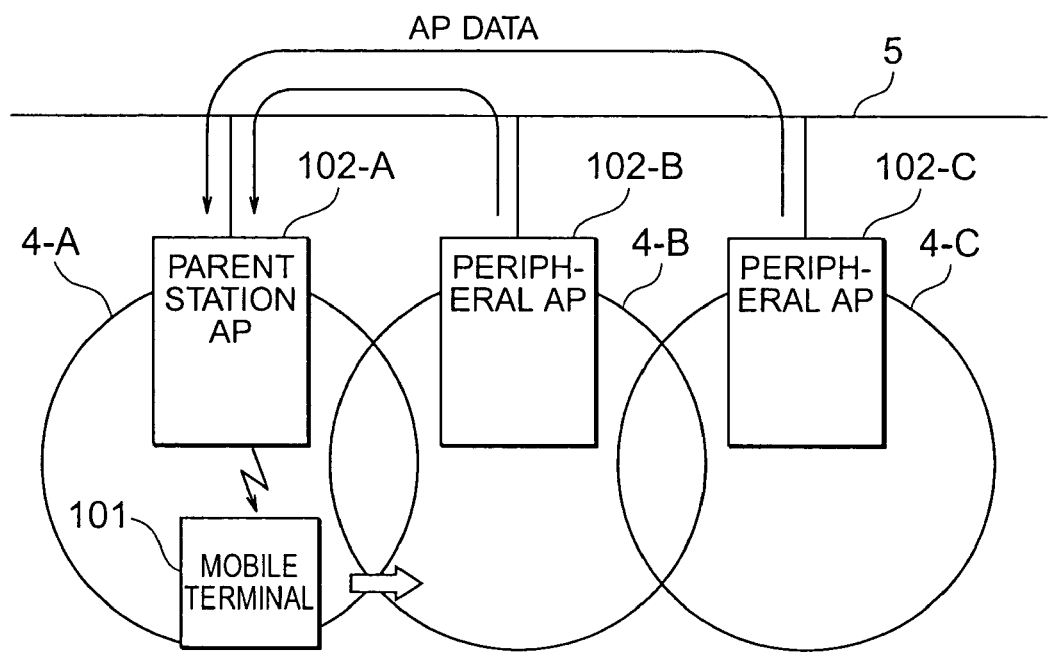
FIG. 1 is a diagram showing a conventional system configuration.
Figure 2:
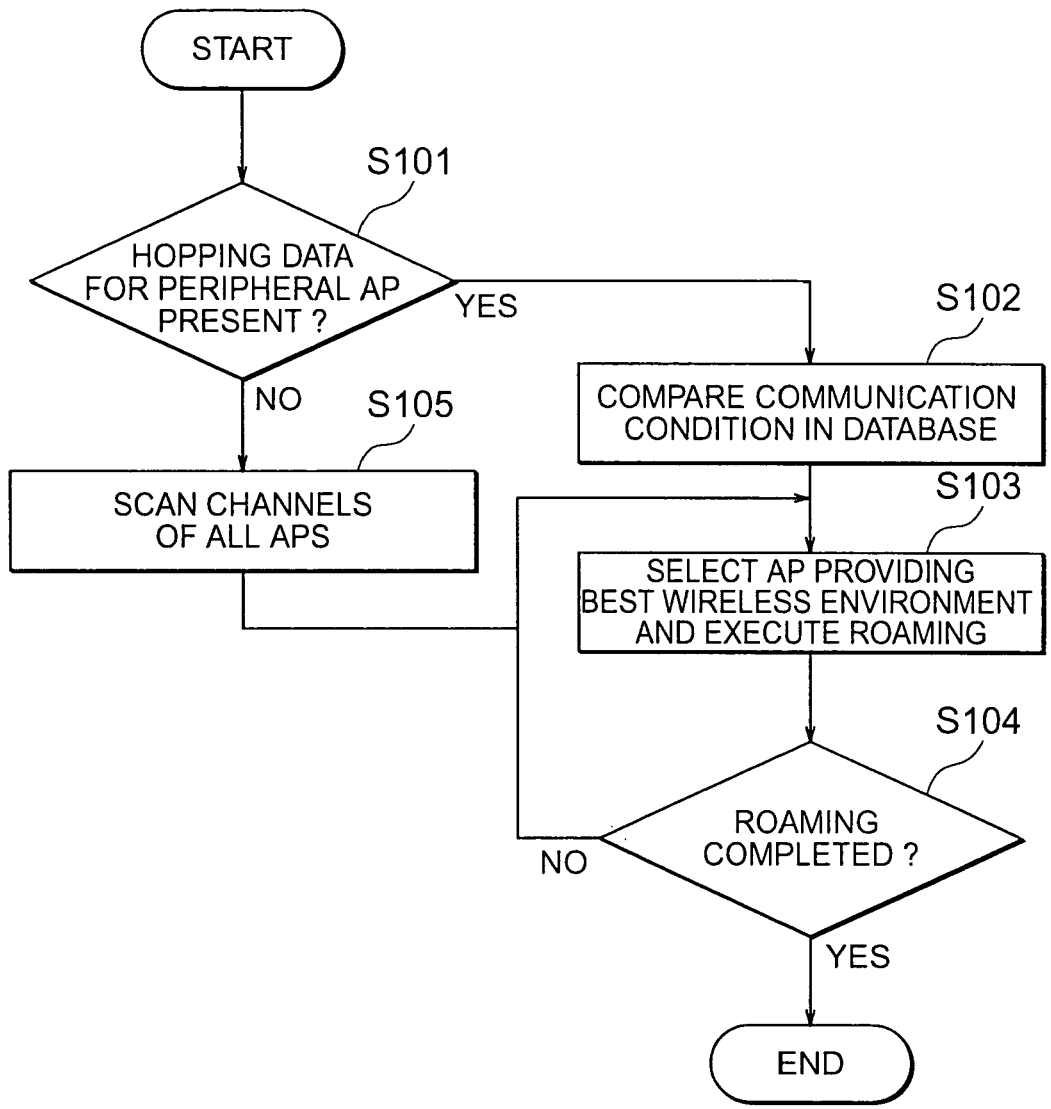
FIG. 2 is a flowchart showing the roaming operation performed by a mobile terminal in FIG. 1.

The AP search processing performed by the mobile terminal 1 will now be described while referring to FIG. 6, in addition to FIGS. 1 and 2. This processing is performed when the communication switch of the mobile terminal 1 is ON.

The mobile terminal 1 performs the AP search process when data transmission or reception, or the roaming operation are not performed (NO at step S1). This search process is the active search process or the passive search process described above, and the search type is not specifically designated.

Since the decision at step S1 is NO when the communication switch of the mobile terminal 1 is turned on, the function controller 16 detects this state, and drives the AP search unit 13 to search for the peripheral APs 2-B, . . . and collects the AP data (step S2).

The decision of YES at above step S2 is that there are peripheral connectable APs, such as the APs 2-B and 2-C, as a result of the search. The AP search unit 13 receives the AP data, such as the SSID, the MAC address and the wireless channel numbers, of the peripheral APs 2-B and 2-C. Then, the AP data are transmitted from the AP search unit 13 to the storage unit 15, and the data in the AP data table 151 are updated (step S3). After the data have been updated, the function controller 16 starts a search timer (step S4). This search timer may be provided for the AP search unit 13.

Following step S4, whereat the search timer is started, there are cases that no transmission/reception of data or no roaming process is performed (NO at step S5), and the time set by the search timer has not been reached (NO at step S6). The above processing is repeated until the decision is YES at step S6, i.e., when the time set by the search timer has elapsed. When the time set by the search timer has been reached, the search timer is initialized (step S7) and program control returns to step S1.

That is, generally, the AP search is repeated by the search timer for every predetermined period until the decision at step S1 for the data transmission condition or the roaming start condition is YES. It is preferable that the search interval for the peripheral AP 2-B . . . , for example, the walking speed of a person (about 1 m/s) whereat, during one second, the searching can be performed for the APs for all the wireless channels.

During the decision of YES at above step S1 or during the roaming operation, an AP search request is issued by the function controller 16 (YES at step S11), which will be described later. At this time, a search is made for the peripheral APs, as described above, to collect the AP data (YES at step S12), and the data in the AP data table 151 are updated (step S13). Program control then returns to step S1.

When the decision is NO at above step S2 and when the AP data can not be collected, program control also returns to step S1 to repeat the processing.

When the decision is YES at above step S5, or when the data transmission/reception or the roaming has been started, program control advances to step S7 whereat the search timer is initialized. The program control then returns to step S1, and goes to step S11. When the decision is NO at step S11 or S12, program control again returns to above step S1 and repeats the above processing.

The roaming processing will now be described while referring to FIG. 7, in addition to FIGS. 3, 4 and 6.

In FIG. 3, when the mobile terminal 1 currently communicating with the parent station AP 2-A is moved away from the communication area 4-A of the parent station AP 2-A, the roaming start condition is established, and the roaming operation is initiated.

During this processing, the mobile terminal 1 performs the communication process in the off-hook state (step S21). In this state, when the roaming start condition has not been established (NO at step S22) and the communication process has been continued (NO at step S20), program control returns to step S21 and repeats the process until communication is disconnected in the off-hook state of YES at step S20.

When the decision is YES at above step S22 or the roaming start condition has been established, the roaming start instruction unit 17 detects this and transmits a start instruction to the function controller 16. The roaming start condition is, for example, when the beacon quality of the parent AP 2-A, which is stored in the parent beacon quality 153 area, falls below the threshold value of the roaming start condition 154, Upon receiving this instruction, the function controller 16 examines the AP data table 151 to find connectable peripheral APs 2-B, . . . that can be roaming destinations (step S23). When, for example, the peripheral APs 2-B and 2-C are found in the AP data table 151 as roaming destination APs (YES at step S24), the function controller 16 selects one, e.g., AP 2-B, as the roaming destination. And the function controller 16 notifies the roaming execution unit 14, so that the roaming execution unit 14 starts the roaming operation for the selected peripheral AP (step S25).

When the roaming operation has been completed (YES at step S26), program control returns to the above step S21 and the above processing is repeated.

When the decision is NO at above step S24, or no peripheral roaming destination AP 2 is present in the AP data table 151, program control is shifted to step S27, whereat the processing from above step S11 to step S13 is performed. This process is that the function controller 16 issues an AP data search request to the AP search unit 13 and the latest AP data for the peripheral APs 2 is fetched and entered in the AP data table 151. Thereafter, program control returns to above step S23 and the above-described processing performed to search for and select a roaming destination is repeated.

As described above, before the roaming operation is started the AP search unit 13 searches for peripheral APs 2 and stores the latest data obtained for the peripheral APs in the AP data table 151. The data for connectable peripheral APs is registered in the AP data table 151. That is, the AP data entered in the AP data table 151 is to be the data for the peripheral APs that are currently connectable. Therefore, it is highly probable that, as the result of merely one roaming destination AP search, the decision at step S24 will be YES and a roaming destination AP 2 will be selected.

Further, since the roaming order condition 152 is set in advance, when a roaming destination AP search is performed, the AP data held in the AP data table 151 can be employed to immediately select a roaming destination AP.

Since the performance of the roaming operation over the wireless LAN 3 is based on the well-known IEEE 802.11 specifications, no explanation for this operation will be given.

An explanation will now be given for multiple means for setting an area in the AP data table 151 wherein the roaming order is defined in advance and for reducing the period required for the selection of the roaming destination AP 2, as the roaming order condition 152. This roaming order condition in search of a roaming destination AP is to be selecting a roaming destination AP in accordance with the roaming order entered in the AP data table 151.

Figures 8, 9:
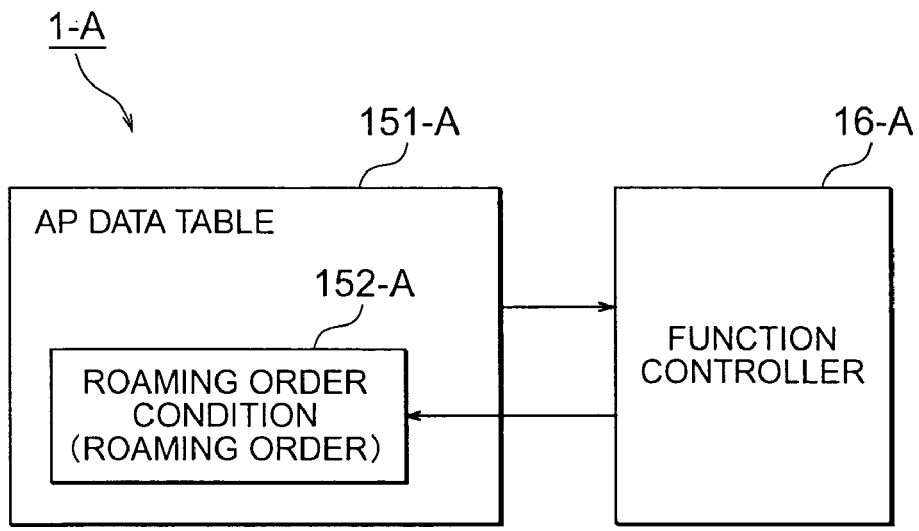
FIG. 8 is a diagram showing part of the functional block arrangement of the mobile terminal in FIG. 4 according to the embodiment for explaining a roaming order condition.
FIG. 9 is a diagram showing the contents of the AP data table of the mobile terminal in FIG. 8 according to the embodiment.

First, while referring to FIGS. 8 and 9, in addition to the above drawings, an explanation will be given for a roaming order condition wherein a peripheral AP 2 that is selected as a roaming destination is correlated with the latest data.

In this case, in addition to the AP data for the peripheral AP 2, a selection order number, used when selecting the roaming destination AP 2, is added to the AP data table 151-A as the roaming order condition 152-A (roaming order). In the example in FIG. 9, MAC addresses, wireless channel numbers, SSIDs and time stamps are stored as AP data. While the AP data obtained by the latest search are recorded in a roaming order "1" as the highest priority, each of the roaming orders is employed that can be reevaluated and assigned a lower priority when newer AP data are obtained. That is, the first peripheral AP 2 that is selected as a roaming destination is defined as the AP for which the latest data is available.

Figure 6:
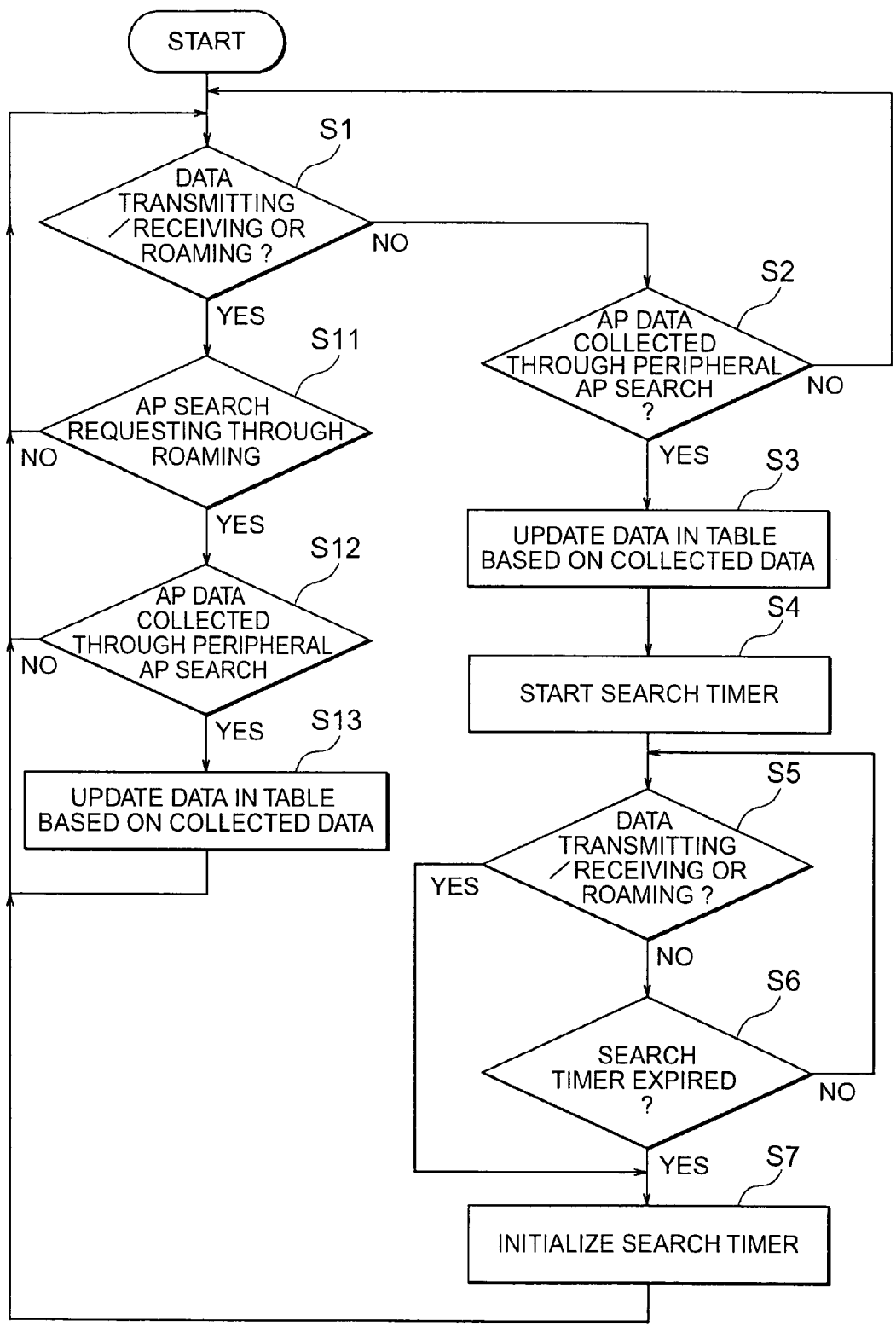
FIG. 6 is a flowchart showing the AP data acquisition processing performed by the mobile terminal in FIG. 3 according to the embodiment of the invention.

During this operation, when at steps S2 and S3, or S12 and S13, as shown in FIG. 6, the mobile terminal 1-A detects the peripheral AP 2, the area for the smallest roaming number is provided, and the detected AD data and relevant predetermined data are recorded. When there are AP data present for the roaming order "1", this AP data is shifted to the next roaming order "2". That is, for the old AP data, a roaming order number is provided already and is subtracted by one to the priority order number, and the oldest AP data are abandoned.

By repeating this process, the data in the AP data table 151-A are updated.

When the mobile terminal 1-A is moved while this process is being repetitively performed, the roaming process is started for the first peripheral AP 2 in the AP data table 151-A.

Through this operation, since the roaming destinations are arranged in order in the AP data table, the period required for the selection can be reduced considerably.

Further, in this embodiment, since the AP data are sorted in order in accordance with the latest search, the validity of the data is high, and the roaming process can probably be completed at the AP that is first selected as a roaming destination. Thus, the roaming period can be reduced.

This recording method can be performed even when the area for recording the roaming order is not especially prepared to function as the AP data table. Further, the same function can be obtained by setting, as the roaming order condition, a selection that is based on the latest data.

In this embodiment, a roaming destination AP is selected in the descending order in which the AP data are detected and recorded. However, the destination AP, for example, may be selected in the ascending order, beginning with the smallest wireless channel number having a number closer to the currently connected channel number, or beginning with the smallest MAC. In this case, preferably, means is added for setting the period wherein the data in the AP data table are valid, and for deleting the data when the validity period has elapsed.

Further, in the AP data table, the contents may be stored of a "BSS (Basic Service Set) description data set" that conforms to the IEEE 802.11 specifications and that includes data obtained by the scanning. In addition, it is also preferable that various other data required for a connection with the roaming destination AP are stored in the AP data table.

Figures 10, 11:
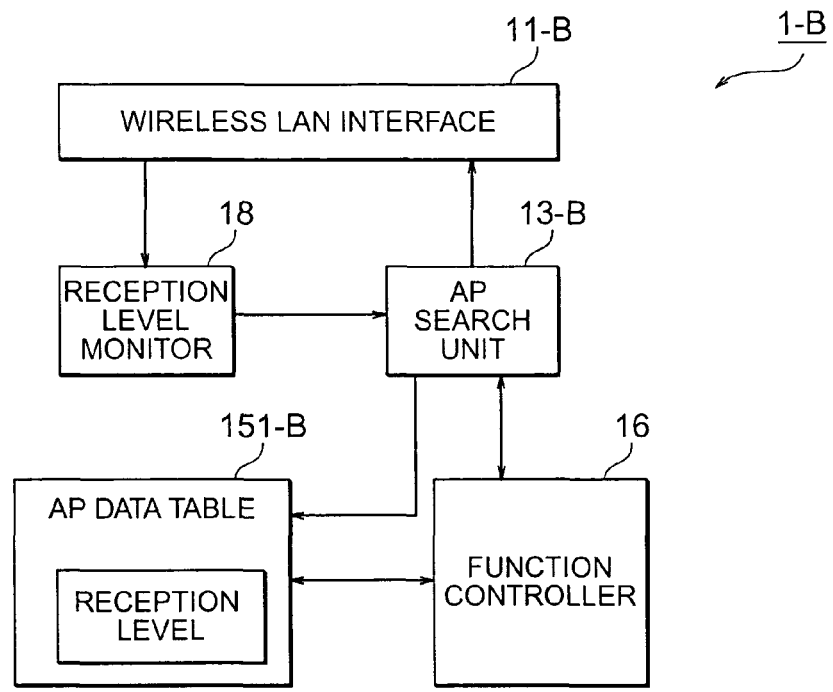
FIG. 10 is a diagram showing part of the functional block arrangement of the mobile terminal in FIG. 4 according to the embodiment for explaining the collection of signal reception levels.
FIG. 11 is a diagram showing the contents of the AP data table of the mobile terminal in FIG. 10 according to the embodiment of the invention.

While referring to FIGS. 10 and 11, in addition to the above drawings, an explanation will now be given for a roaming order condition wherein a peripheral AP 2, which is first selected as a roaming destination, is correlated with the maximum reception level.

In this case, the order in an AP table 151-B is given, beginning with the highest level for the signal received by the peripheral AP 2. And when in this order, a roaming destination AP 2 is searched for, the peripheral AP 2 nearest the mobile terminal 1-B can be selected. Therefore, the selection is performed very correctly and the number of roaming process repetitions can be reduced. As is shown in FIG. 11, a reception level area in which to record a reception level by using a percentage is provided in the AP data table 151-B, in addition to the data areas shown in FIG. 9. That is, a reception level monitor 18 is additionally provided for the mobile terminal 1 in FIG. 4, and it monitors the reception level of signals received over the wireless LAN interface 11. The monitored reception level is transmitted to an AP search unit 13-B, and is stored in the reception level area of the AP data table 151-B.

Basically, the operation of a mobile terminal 1-B in this case is the same as that explained while referring to FIG. 6.

As described above, the AP search unit 13-B of the mobile terminal 1-B periodically performs a search to determine whether a connectable peripheral AP 2 is present. During the AP search, the reception level monitor 18 continues to monitor the level of a received signal, and when a peripheral AP 2 is detected, in addition to the above described AP data, it stores this level in the reception level area in the AP data table 151-B.

Then, the AP data in the AP data tale 151-B are sorted, beginning with the highest level of the received signal. And in this case, based on the validity of the data, the AP data are deleted for which a predetermined period of time, or longer, has elapsed since the time indicated by the time stamp in the table 151-B. When the AP data and the signal for the same peripheral AP 2 are received, the AP data in the AP data table 151-B are overwritten with the latest available AP data. In this manner, data updating is performed.

When, as a result of the updating, different peripheral APs 2 are present at the same reception level, the AP data may be sorted in order, beginning with the newest time stamp or in the ascending order of the MAC address value. However, while taking the reliability of the AP data into account, it is preferable that the AP data be sorted in accordance with the time stamp.

The mobile terminal 1-B is moved while this operation is repeatedly performed and then the roaming start condition is established. At the time for the roaming start, the roaming is performed for the connection of the peripheral AP for which the AP data in the AP data table 151-B indicate the first roaming order and the highest reception level.

The reception level is proportional to the square of the distance between the AP 2 and the mobile terminal 1-B. Therefore, sorting of the AP data for beginning with the highest reception level means that the APs 2 are sequentially searched for beginning with the AP 2 nearest the mobile terminal 1B. Further, for a case wherein the mobile terminal 1-B is linearly moved, the fact that the mobile terminal 1-B is close to the AP 2 also means that the distance for the next roaming is long. Thus, the number of the roaming operations can be reduced.

An explanation will now be given, while referring to FIG. 12, in addition to the above drawings, for the roaming order condition wherein the peripheral AP 2 for that was first selected as the roaming destination is correlated with the number of currently connected mobile terminals 1-C.

Figure 12:
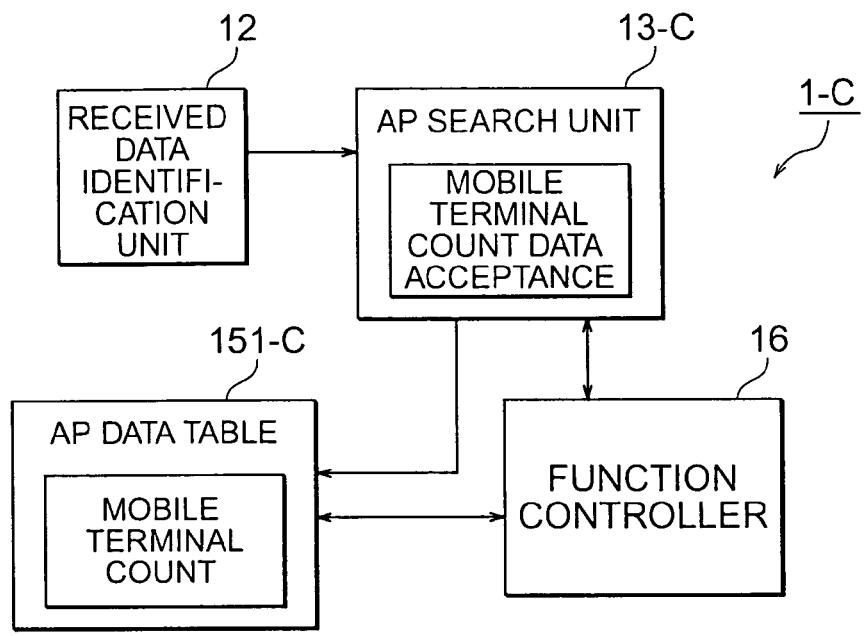
FIG. 12 is a diagram showing part of the functional block arrangement of the mobile terminal in FIG. 4 according to the embodiment for explaining the collection of data for a number of mobile terminals.

In FIG. 12, the order in an AP data table 151-C is given, beginning with a peripheral AP 2 that is connected to the smallest number of mobile terminals 1. Therefore, a function controller 16-C can perform the roaming operation to obtain the peripheral AP 2 that is connected to the smallest number of mobile terminals 1, and the load imposed to the individual APs 2 can be dispersed.

In this case, the AP data transmitter 23 of the AP 2 includes the same function as the beacon and probe response function defined according to the IEEE 802.11e specifications, and notifies data for the number of currently connected mobile terminals 1.

An AP search unit 13-C of a mobile terminal 1-C has a mobile terminal count data acceptance function for extracting currently connected mobile terminal count data from a beacon signal and a probe response that are received as AP data. The AP search unit 13-C transmits the received data to the AP data table 151-C and stores them as AP data.

Figure 7:
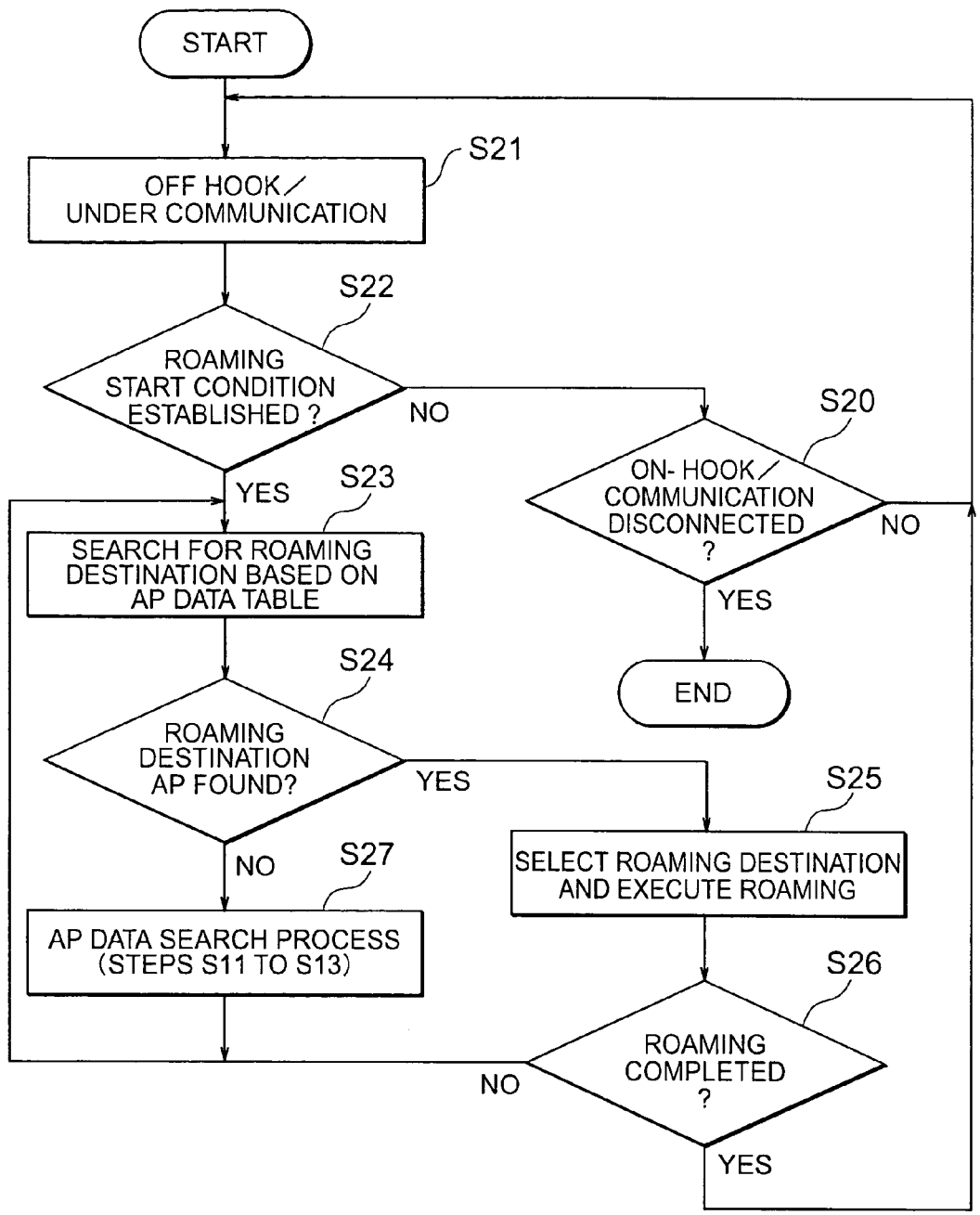
FIG. 7 is a flowchart showing the roaming operation performed by the mobile terminal in FIG. 3 according to the embodiment of the invention.

The operation of the mobile terminal 1-C is basically the same as that explained while referring to FIGS. 6 and 7.

In the same manner as described above, the AP search unit 13-C of the mobile terminal 1-C periodically performs a search to determine whether there is a connectable peripheral AP 2 present. When a peripheral AP 2 is found, the number of mobile terminals 1 obtained from the detected AP 2 is recorded in the AP data table 151-C, in addition to those entered in the AP data table 151-A in FIG. 9.

The AP data stored in the AP data table 151-C are sorted so they correspond with the order beginning with the smallest number of mobile terminals 1. Therefore, the AP data are deleted, for which a predetermined 10 period or longer has elapsed since the time indicated by the time stamp. When the signal for the same AP 2 is received, the old AP data are overwritten using the latest AP data.

When, as a result of the updating, there are different Aps 2 having the same number of mobile terminals 1, the Aps 2 may be sorted further in the order that begins with the newest time stamp or in the ascending order of the MAC address values. However, while taking the reliability of the AP data into account, it is preferable that the AP data are sorted based on the time stamp.

The mobile terminal 1-C is moved while this process is being repeated and then the roaming start condition established. At the time of the roaming start, the roaming is performed for the connection to a peripheral AP 2 for which the AP data in the AP data table 151-C indicate the first roaming order and the smallest number of mobile terminals 1.

When the AP 2 having the smallest number of currently connected mobile terminals 1 is selected as a roaming destination, the loads imposed on the Aps 2 can be automatically dispersed, and an AP providing a good communication environment can be selected as a connection destination.

In the above explanation, data for the number of currently connected mobile terminals 1 has been transmitted by the beacon and the probe response function. However, the data transmitted by the AP 2 and the mobile terminal 1-C are not limited to these, and a packet to provide notification of the traffic condition of the AP 2 may be transmitted.

While referring to FIG. 13, in addition to the above drawings, an explanation will now be given for the roaming order condition wherein the peripheral AP 2 that is first selected as a roaming destination is correlated with an error ratio for data that are currently being transmitted and received.

In this case, the order in an AP data table 151-D is given, beginning with the peripheral AP 2 for which an error ratio of data that are currently transmitted and received is the lowest. Therefore, the function controller 16 can perform a roaming operation for the connection to the peripheral AP 2 having the smallest error ratio of data that are currently being transmitted and received, so that through the roaming operation an AP 2 providing a better communication environment can be selected.

For this processing, the AP data transmitter 23 of the AP 2 has the same beacon as the probe response function defined according to the IEEE 802.11e specifications, and the error ratio data is transmitted.

An AP search unit 13-D for a mobile terminal 1-D has an error ratio data acceptance function for extracting the error ratio data from the beacon and the probe response that are received as AP data. The received data are transmitted to an AP data table 151-D and are stored as AP data.

The operation of the mobile terminal 1-D is basically the same as that explained while referring to FIGS. 6 and 7.

In the same manner as described above, the AP search unit 13-D of the mobile terminal 1-D periodically performs a search to determine whether there is a connectable peripheral AP 2. When such a peripheral AP 2 is found, the error ratio obtained from this detected AP 2 is stored in the AP data table 151-D, in addition to those entered in the AP data table 151-A in FIG. 9.

The AP data stored in the AP data table 151-D are sorted in order beginning with the smallest error ratio. Therefore, the AP data are deleted for which a predetermined time has elapsed since the time indicated by the time stamp. Further, when a signal is received from the same AP 2, the old AP data are overwritten by the latest AP data.

When, as the result of updating, there are different APs 2 having the same error ratio, the AP data may be further sorted in the order beginning with the newest time stamp or in the ascending order of the MAC addresses. However, while taking into account the reliability of the AP data, it is preferable that the AP data are sorted based on the time stamp.

The mobile terminal 1-D is moved while this processing is being repeated and then the roaming start condition is being established. At the time for the roaming start, the roaming operation is performed to obtain a peripheral AP 2 for which the AP data in the AP data table 151-D indicate the first order and the smallest error ratio.

Since the AP 2 having the smallest error ratio is defined as a roaming destination, the loads imposed on the APs 2 can be automatically dispersed, and the AP 2 providing a good communication environment and a noiseless source can be selected.

In the above embodiment, the data for the error ratio are transmitted by the AP 2 to the mobile terminal 1-D by the beacon and the probe response function. However, a packet for transmitting notification of the traffic condition of the AP 2 may be transmitted.

Figure 14:
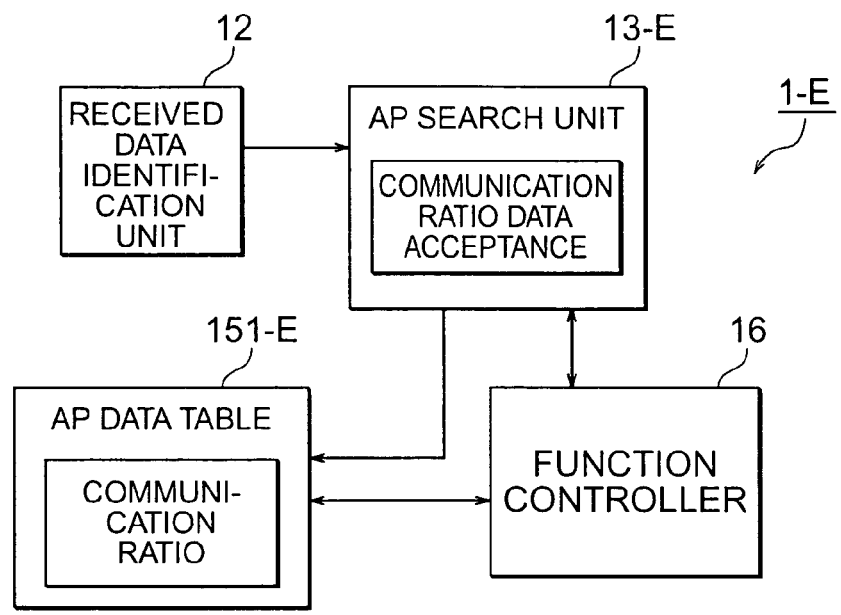
FIG. 14 is a diagram showing part of the functional block arrangement of the mobile terminal in FIG. 4 according to the embodiment for explaining the collection of communication ratio data.

While referring to FIG. 14, in addition to the above drawings, an explanation will now be given for the roaming order condition wherein the peripheral AP 2 that is first selected as a roaming destination is correlated with the communication ratio for the communication band of the AP 2.

In this case, the order is given in which an AP data table 151-E is used, beginning with a peripheral AP 2 for which the communication ratio relative to the communication band is lowest. Therefore, the function controller 16 can perform a roaming operation to find the peripheral AP 2 for which the communication ratio relative to the communication band is the lowest, and the AP 2 providing a better communication environment can be selected.

In this process, the AP data transmitter 23 of the AP 2 has the same beacon and probe response function as is defined by the IEEE 802.11e specifications, and transmits the communication ratio data.

An AP search unit 13-E for a mobile terminal 1-E has a communication ratio data acceptance function, for extracting the communication ratio data from the beacon signal and the probe response that are received as AP data. The received data are then transmitted to the AP data table 151-E and are stored as the AP data.

The operation of the mobile terminal 1-E is basically the same as that explained while referring to FIGS. 6 and 7.

In the same manner as described above, the AP search unit 13-E of the mobile terminal 1-E periodically performs a search to determine whether there is a connectable peripheral AP 2. When such a peripheral AP 2 is found, the communication ratio obtained for this detected AP 2 is stored in the AP data table 151-E, in addition to the data entered in the AP data table 151-A in FIG. 9.

The AP data stored in the AP data table 151-E are stored in order beginning with the lowest communication ratio. Therefore, the AP data are deleted for which a predetermined period has elapsed since the time indicated by the time stamp. And when a signal is received for the same AP 2, the old AP data are overwritten with the latest AP data.

When, as a result of the updating, there are different APs 2 having the same communication ratio, the AP data may be further sorted in the order beginning with the newest time stamp or in the ascending order of the MAC address values. However, while taking the reliability of the AP data into account, it is preferable that the AP data are sorted based on the time stamp.

The mobile terminal 1-F is moved while this process is being repeated and then the roaming start condition has been established. At this time for the roaming start, the roaming operation is performed to obtain a peripheral AP 2 for which the AP data in the AP data table 151-E indicate the first order and the lowest communication ratio.

Since the AP 2 having the lowest communication ratio is defined as a roaming destination, the AP providing a better communication ratio wherein the wireless communication traffic is not heavy can be selected.

In the above explanation, the communication ratio is transmitted by the AP 2 to the mobile terminal 1-E by the beacon and probe response function. However, a packet may be transmitted for the notification of the traffic condition of the AP 2.

Figure 15:
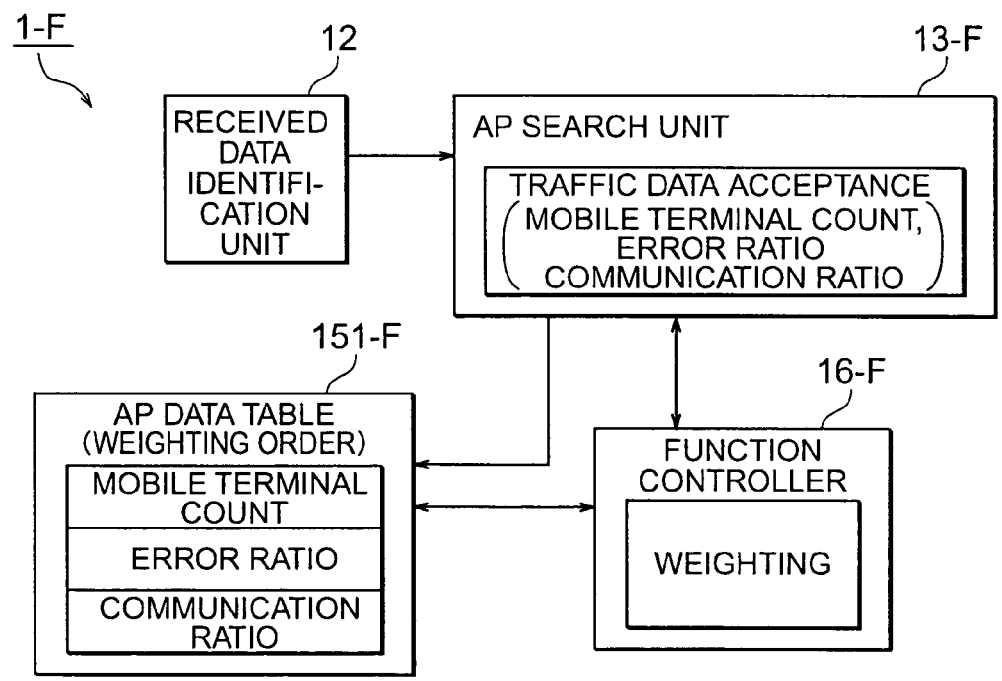
FIG. 15 is a diagram showing part of the functional block arrangement of the mobile terminal in FIG. 4 according to the embodiment for explaining the collection of traffic data and the weighting of each entry.

While referring to FIG. 15, in addition to the above drawings, an explanation will now be given for the roaming order condition whereby a mobile terminal 1-F finds a peripheral AP 2 that provides a better communication environment. That is, the peripheral AP 2, which is first selected as a roaming destination, is correlated with the number of mobile terminals, the error ratio and the communication ratio described above. And predetermined weighting is performed for these data in the individual order ranks, the resultant values are added for each AP 2, and the roaming operation is performed, beginning with the AP 2 having the smallest sum, In this case, the order in an AP data table 151-F is provided beginning with a peripheral AP 2 having the smallest number of mobile terminals 1, and the error ratio and the communication ratio that are obtained by weighting. Therefore, the function controller 16 can perform the roaming operation to find a peripheral AP 2 providing a better communication environment.

In this example, the AP data transmitter 23 of the AP 2 has the same beacon and probe response functions as are defined by the IEEE 802.11e specifications, and transmits the traffic data included in the beacon and probe response.

An AP search unit 13-F for a mobile terminal 1-F has a traffic data acceptance function, for extracting traffic data from the beacon and the probe response that are received as AP data. The received data are transmitted to the AP data table 151-F, and the number of mobile terminals, the error ratio and the communication ratio are stored as the AP data.

The operation of the mobile terminal 1-F is basically the same as that explained while referring to FIGS. 6 and 7. It should be noted, however, that a function controller 16-F must perform the weighting for the number of mobile terminals 1, the error ratio and the communication ratio stored in the AP data table 151-F, and must calculate the sum of these data.

In the same manner as is described above, an AP search unit 13-F for the mobile terminal 1-F periodically performs a search to determine whether there is a connectable peripheral AP 2. When such a peripheral AP 2 is found, following data are stored in the AP data table 151-F, in addition to those entered in the AP data table 151-A shown in FIG. 9. The stored data are the number of mobile terminals 1, the error ratio and the communication ratio, and all of which are included in the traffic data obtained from the detected AP 2.

The ranks provided for the individual entries of the AP data in the AP data table 151-F, including the number of mobile terminals 1, are added to the error ratio and the communication ratio.

The weighting process is then performed as follows. For example, the rank for the time stamp is multiplied by one, the rank for the reception level is multiplied by two, and the rank for the number of mobile terminals is multiplied by 1.5, and the obtained values for the individual entries are added together. Thus, the obtained sum for each AP 2 is stored in the AP data table 151-F, and the roaming operation is performed in order beginning with the peripheral AP 2 having the smallest sum.

This weighting information can be set as a roaming order condition. When the storage unit 15 has an internal control function, the weighting process may be performed in the storage unit 15.

Since the AP 2 having the smallest sum obtained by the weighting is defined as a roaming destination, the roaming operation can be performed in the order beginning with the AP 2 that has the best communication environment under the individual conditions. Further, when the weighting is changed, the policy for the selection of the roaming destination can be altered.

In the above description, the AP data that the mobile terminal 1-F receives from the AP 2 is a beacon signal or a probe response. However, instead of this, a packet may be transmitted for providing notification of the traffic condition, such as the communication ratio or the reception level of the AP 2.

In addition, the traffic data are the time stamp, the reception level, the number of connected mobile terminals, the communication ratio and the error ratio. However, the traffic data are not limited to these, and other traffic data, such as the number of transmitted and received packets, may be additionally included.

In this example, a policy server for providing notification for the weighting policy may be arranged across the network. In this case, the roaming policy can be dynamically changed in accordance with the traffic condition of the wireless LAN network 3, and the load imposed on each AP 2 can also be distributed.

The roaming start condition for a mobile terminal 1-G will now be described while referring to FIGS. 16 to 18.

Specifically, the transient state of the level of communication data received by the mobile terminal 1-G is recorded and compared with the past reception level, and the roaming operation is initiated only when the reception level had gradually been degraded. Thus, a situation wherein the disconnecting of communication will be predicted can be avoided. For example, such situation occurs in a case wherein the roaming is generated due to a temporary change in the reception level, or in a case wherein the roaming operation is initiated before the parent station disconnects the line because the reception level has suddenly been reduced.

Figure 16:
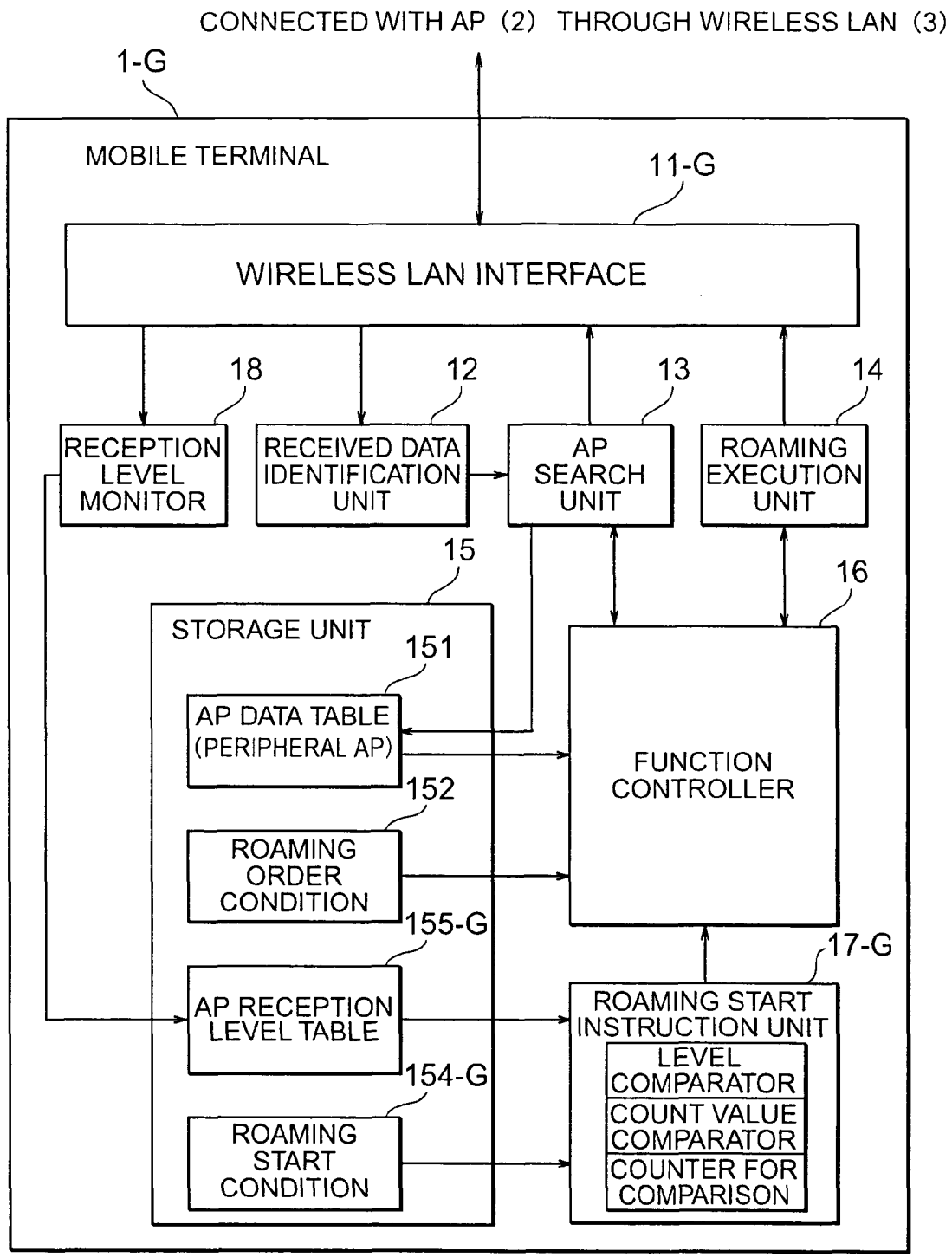
FIG. 16 is a diagram showing the functional block arrangement of a mobile terminal other than the one in FIG. 4.

FIG. 16 is a block diagram showing the configuration of the mobile terminal 1-G according to the embodiment.

One of the differences between the mobile terminal 1-G and the mobile terminal 1 is that the monitored reception level for a wireless signal received from the parent station AP is stored in an AP reception level table 155-G. The other one is that a roaming start instruction unit 17-G includes a function for comparing the reception level of the wireless signal with the reception level in the past and a counter for comparing.

Therefore, the roaming start instruction unit 17-G holds, in advance, a threshold value S, for detecting the degrading of the reception level, and a count setup value n in the counter, for detecting the continuous degradation of that the reception level is continuously degraded.

FIG. 17 is a diagram showing an example for the AP reception level table 155-G.

As shown in FIG. 17, BSSIDs (Basic SSIDs), which are MAC addresses of the connected parent AP, the time stamps that are detection times, and the reception levels.

The reception level can be represented by either a radio wave strength, reception efficiency that employs a predetermined wave strength as a reference, a rank correlated with the wave strength, or an RSSI (reception signal strength index) defined by the IEEE 802.11 specification.

Figure 18:
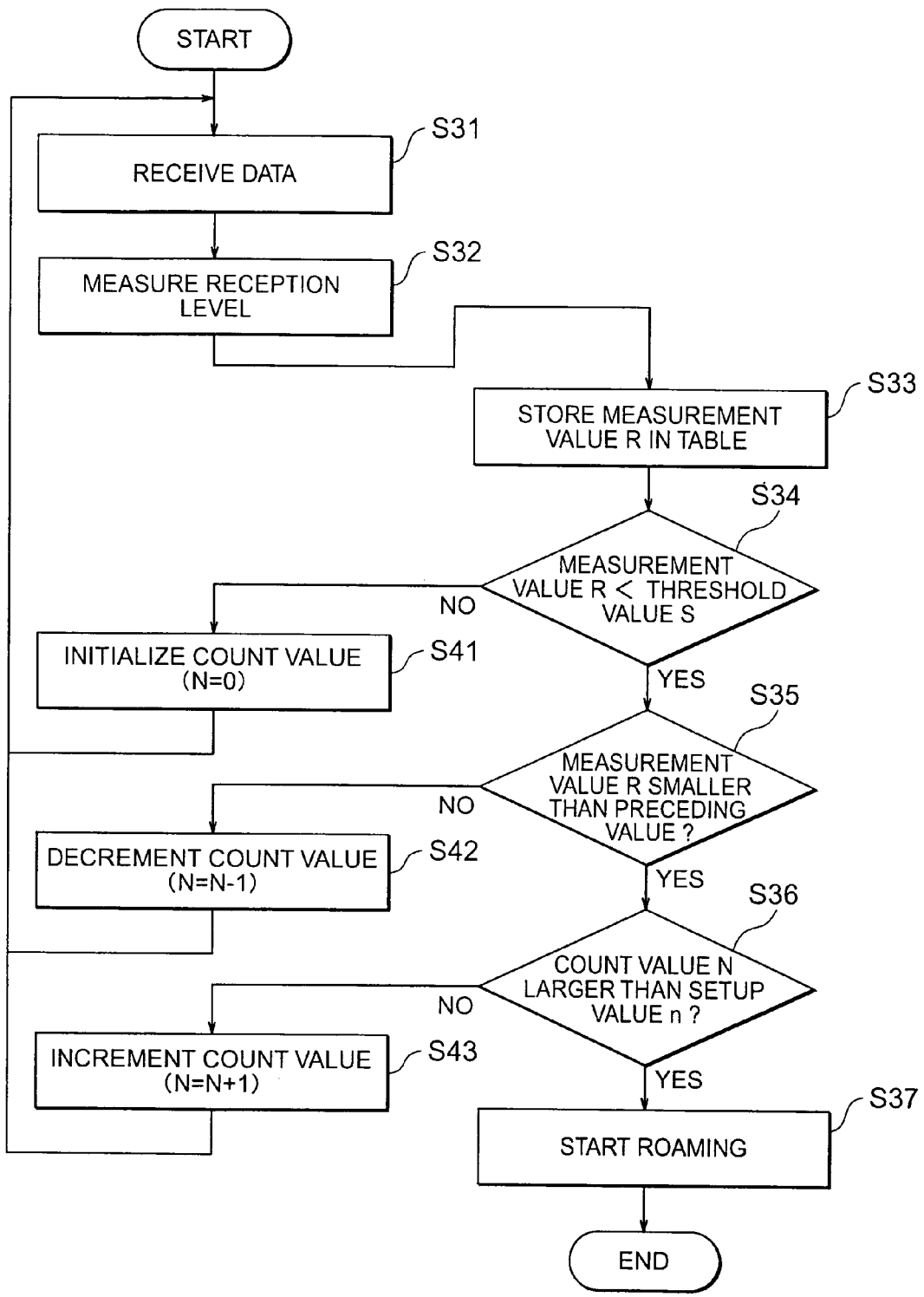
FIG. 18 is a flowchart showing the roaming processing performed by the mobile terminal in FIG. 16.

FIG. 18 is a flowchart showing the operation of the mobile terminal 1-G.

The mobile terminal 1-G receives data as a wireless LAN signal from the parent station AP that is currently connected (step S31), and each time monitors and measures the reception level (step S32). This measurement value R is recorded in the AP reception level table 155-G (step S33). The roaming start instruction unit 17-G compares the measurement value R of the reception level with the threshold value S that is held by the level comparison function (step S34).

When the decision is YES at step S34 is i.e. when the measurement value R is smaller than the threshold value S. At this time, the measurement value R is compared with the preceding reception level (step S35). The preceding data to be compared may be stored by the roaming start instruction unit 17-G.

When the decision is YES at step S35 is i.e. when the measurement value R is smaller than the preceding value. At this time, the roaming start instruction unit 17-G compares a reception level measurement count value N with a setup value n that is held by the count value comparison function (step S36).

When the decision is YES at step S36 is i.e. when the count value N is greater than the setup value n. At this time, it is assumed that, within the range smaller than the threshold value S, the measurement value R is below the preceding measurement value sequentially by the times more than the setup value n. Therefore, the roaming start instruction unit 17-G immediately transmits a roaming start instruction to the function controller 16 (step S37).

The count value N is determined in the following manner.

First, when the decision is NO at step S34, the measurement value R is normal, and the count value N is initialized to N=0 (step S41). When the decision is NO at step S35, the measurement value R is higher than the preceding value, and the count value N is subtracted by one is set to "N−1" (step S42). When the decision at step S36 is "NO", the count value N does not yet reach the setup value n, and the count value N is incremented by one and is set to "N+1" (step S43).

While referring to the AP reception level table 155-G in FIG. 17, the management numbers are provided beginning with the reception level that is latest detected, as is indicated by the time stamp.

The operation will now be described while referring to the history from management number 6 to management number 1, when the threshold value S=80% and the count setup value n=2.

Since for the management number 6, the reception level of 100% is larger than the threshold value S of 80%, the counting is not initiated at step S41 and the count value N=0. For the management number 5, the reception level of 70% is lower than the threshold value S of 80% and the preceding reception level of 100%, and the count value N=0 does not yet reach the setup value n=3. Therefore, according to step S42, the count value N is incremented by one and is set to N=1. For the management number 4, since the reception level of 90% is larger than the threshold value S of 80%, the count value N is reset to N=0. Similarly, for the management number 3, the count value is incremented by one and is set to N=1. For the management number 2, the count value N is also incremented by one and is set to N=2. For the management number 1, since the reception level is smaller than the threshold value S of 80% and is also smaller than the preceding reception level three times in row, the count value N=3 is obtained. Since the count value N is equal to or greater than the setup value n=2, the roaming is initiated at this time.

With this configuration, the roaming is initiated only when the reception level is gradually reduced, and the temporary reduction of the reception level, such as for the management number 5, is not considered.

Since the linearity of the signal wave is improved especially for a high-frequency wireless LAN, a temporary change due to an obstacle tends to occur. Furthermore, the reception level may be deteriorated due to the interference between a wireless LAN of, for example, 2.4 GHz band and another apparatus such as a microwave that employs the same wireless frequency. However, when the roaming is performed when the reception level is temporarily changed, the mobile terminal may be located still far away from another peripheral AP. Under this condition, after the roaming is completed to select another peripheral AP, the mobile terminal may be returned again to the parent station AP. According to this embodiment, however, since the roaming is performed only when the reception level is reduced step by step, the robustness relative to the temporary fluctuation can be increased.

In the above explanation, the start of the roaming is determined based on the level of a signal received from the parent station AP that is currently connected. However, the level of a signal received from the peripheral AP through the AP search can also be employed. That is, when the level of a signal received from the peripheral AP by the AP search unit is higher than the level of the signal received from the parent station AP that is currently connected, the roaming process can be started. In other words, the roaming is performed to select a peripheral AP having a communication environment the reception level is higher than that for the currently connected parent station AP.

This processing will now be described while referring to FIG. 16.

The level of the received signal can be monitored through the search of the APs other than the parent station AP, and the measurement value can be recorded in the AP reception level table 155-G. And there are such cases that the level of the signal received by the AP search unit 13 is higher than that from the currently connected parent station AP that is recorded as a level comparison value, and is equal to or larger than a predetermined value. In this case, the roaming start instruction unit 17-G instructs the start of the roaming. For example, when the reception level for the currently connected parent station AP is 70% and the predetermined value is 20%, and when the peripheral AP for which the reception level is 90% or higher is found, the roaming start instruction unit 17-G instructs the roaming start.

With this configuration, when, for example, the mobile terminal is located at a position where the roaming is not required, but there are cases that the connection state with the parent station AP is degraded or the reception level is reduced. In this case, the start of the roaming is instructed since the communication efficiency is also reduced. Therefore, the communication environment of the mobile terminal can be improved.

Furthermore, in the above explanation, the start of the roaming is determined based on the error ratio of communication data received from the currently connected parent station AP. However, the roaming start can also be determined by fetching the error ratio of communication data received from the peripheral AP through the AP search. More specifically, when the error ratio of the communication data that the AP search unit receives from the peripheral AP is lower than the error ratio for the currently connected parent station AP, the roaming can be started. That is, a peripheral AP providing a communication environment where the error ratio is lower than that of the connected parent station AP can be selected through the roaming.

Figure 13:
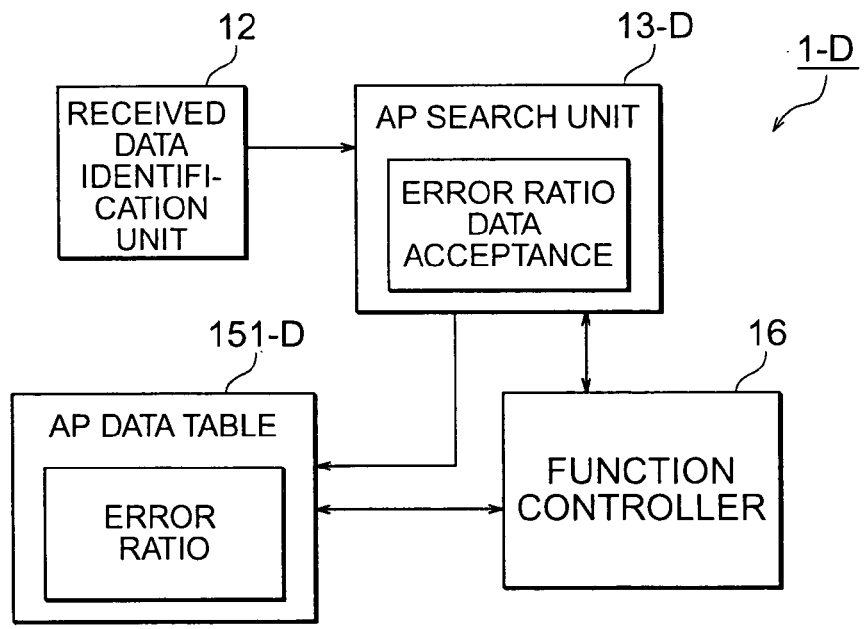
FIG. 13 is a diagram showing part of the functional block arrangement of the mobile terminal in FIG. 4 according to the embodiment for explaining the collection of error ratio data.

In this embodiment, as explained while referring to FIG. 13, the error ratios of the peripheral APs 2 are received by the AP search unit 13-D of the mobile terminal 1-D, and are stored in the AP data table 151-D.

The error ratio included in a beacon signal received from the connected parent station AP is compared with each error ratio entered in the AP data table 151-D. And when there is a peripheral AP having a lower error ratio than the parent station AP, the roaming start is instructed. The roaming destination is a peripheral AP having a lower error ratio. However, as is described above, the mobile terminal may be connected to a peripheral AP that is at the first rank in the order and that provides the best communication environment.

Further, as well as explained for the reception level, when the comparison of the error ratios is performed step by step, the long deterioration of the error ratio can be identified, i.e., the communication environment for the roaming performance can be improved.

While referring to FIG. 19, an explanation will be given for the function for avoiding the influence on a network by obtaining the end time of a contention-free period (CFP), which is applied for the wireless LAN 3 and is included in a beacon signal or a probe response.

In this embodiment, the AP search unit of the mobile terminal obtains the end of the contention-free period (CFP), which is included in a beacon signal or a probe response received from an AP and during which the mobile terminal allowed by the pertinent AP can perform communication. When the contention-free period is terminated, the AP search unit searches for peripheral APs during a period where the mobile terminal does not transmit or receive data. As a result, since the search for connectable peripheral APs is not performed during such a period as a contention-free period, where the mobile terminal having a communication right is protected, the network is not adversely affected.

Figure 19:
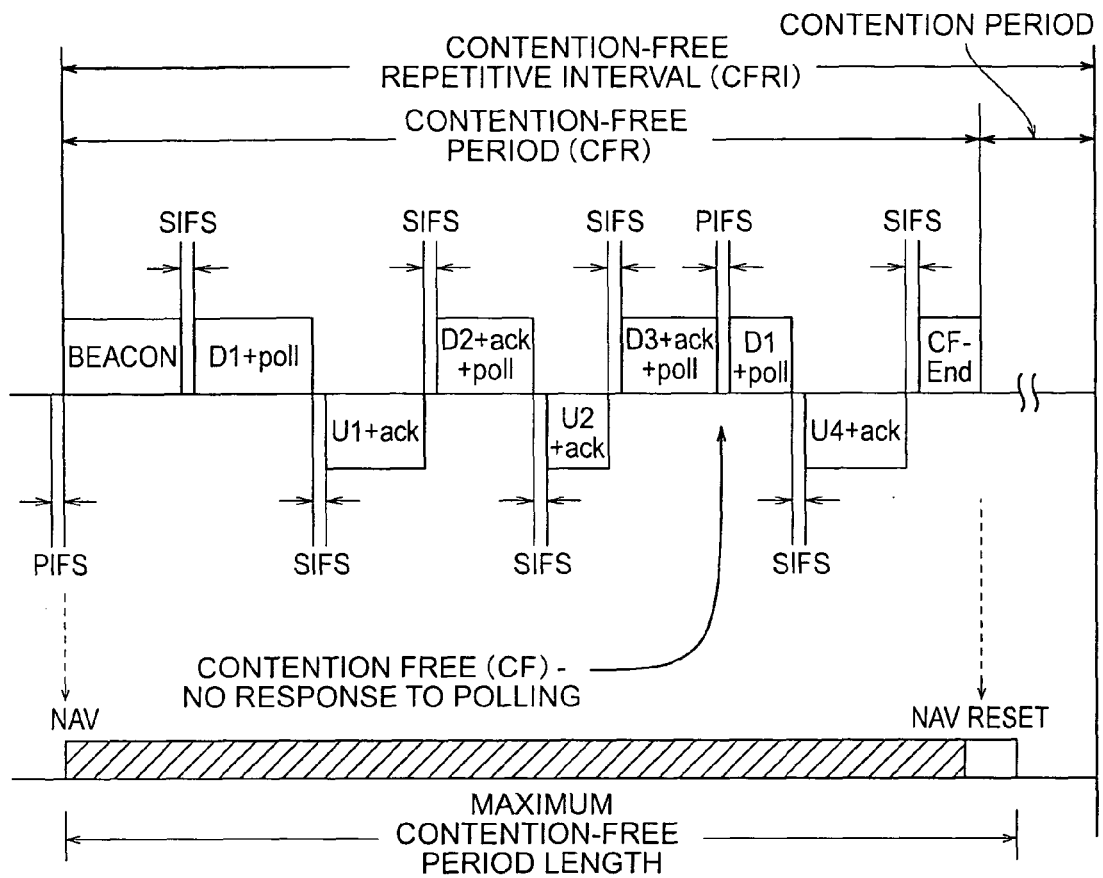
FIG. 19 is a diagram for explaining a period for no contentions across a wireless LAN.

FIG. 19 is a diagram for explaining the contention-free period.

The mobile terminal receives a beacon signal from the currently connected parent station AP by the reception signal monitor, and is synchronously communicating through the wireless LAN with the parent station AP. The parent station AP and the mobile terminal have the PCF function or the HCF function conforming to the IEEE 802.11 or IEEE 802.11e specification.

For the PCF function or the HCF function, there is a contention-free period (hereinafter referred to as a CFP) where the parent station AP provides a signal transmission right for the mobile terminal, and only the mobile terminal that owns this right can perform communication.

The mobile terminal refers to the end time of the CFP included in the beacon signal, and after the CFP is terminated, performs the active scanning or the passive scanning to search for peripheral APs. Further, when the mobile terminal can not perform communication during the CFP, the mobile terminal performs the passive search, so that the peripheral APs can be found without adversely affecting the network, and the AP data can be entered to the AP data table.

While referring to FIGS. 20 to 24, an explanation will now be given for the arrangement wherein one of all the APs 2 connectable through the LAN 5 is selected as a master AP.

Figure 20:
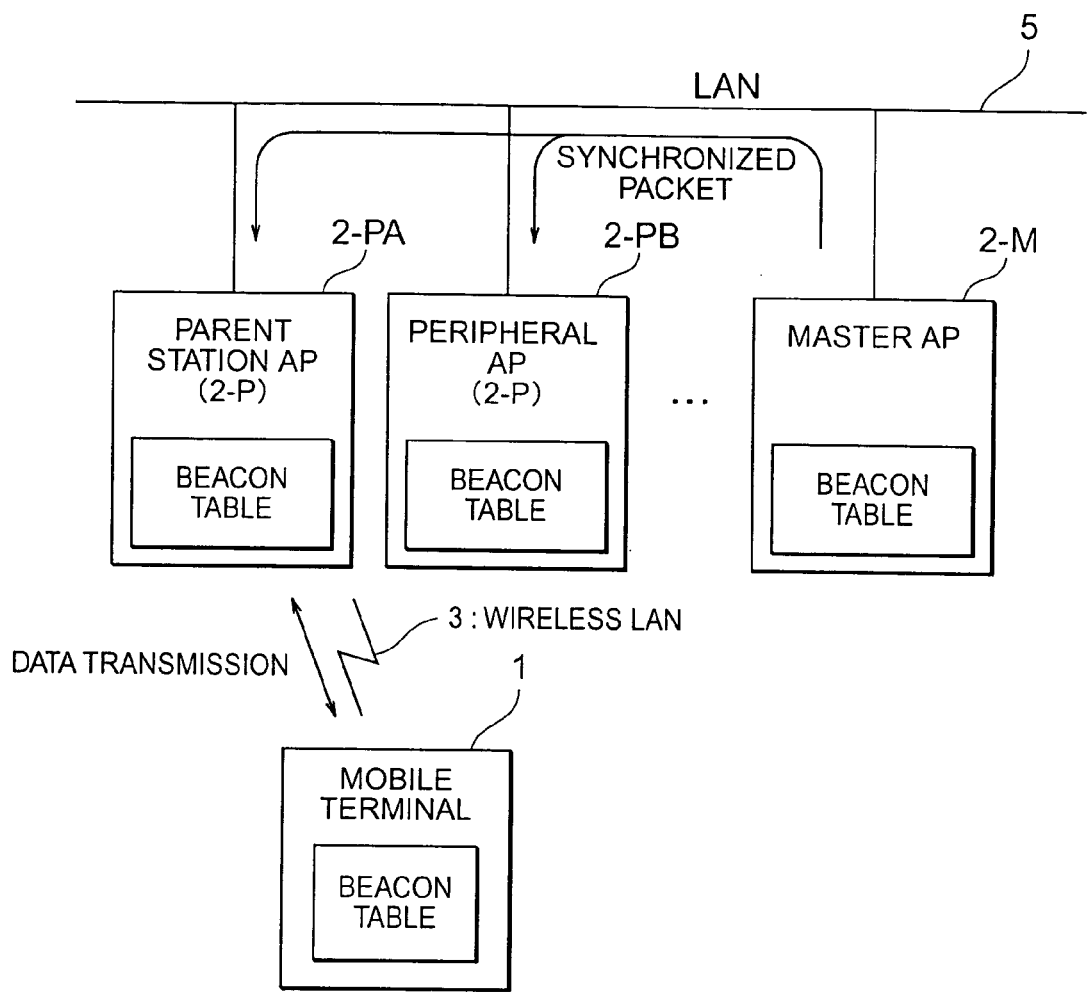
FIG. 20 is a diagram showing a system configuration according to the invention wherein a master AP is provided.

As shown in FIG. 20, the APs 2 to which the mobile terminal 1 can be connected through the LAN 5 are a parent station AP 2-PA that is currently connected, peripheral APs 2-PB, . . . and a master AP 2-M. The master AP 2-M is connected through the LAN 5 to the parent station AP 2-PA and the peripheral APs 2-PB, . . . The parent station AP 2-PA and the peripheral APs 2-PB, except for the master AP 2-M, are APs 2-P having the same arrangement.

Figure 21:
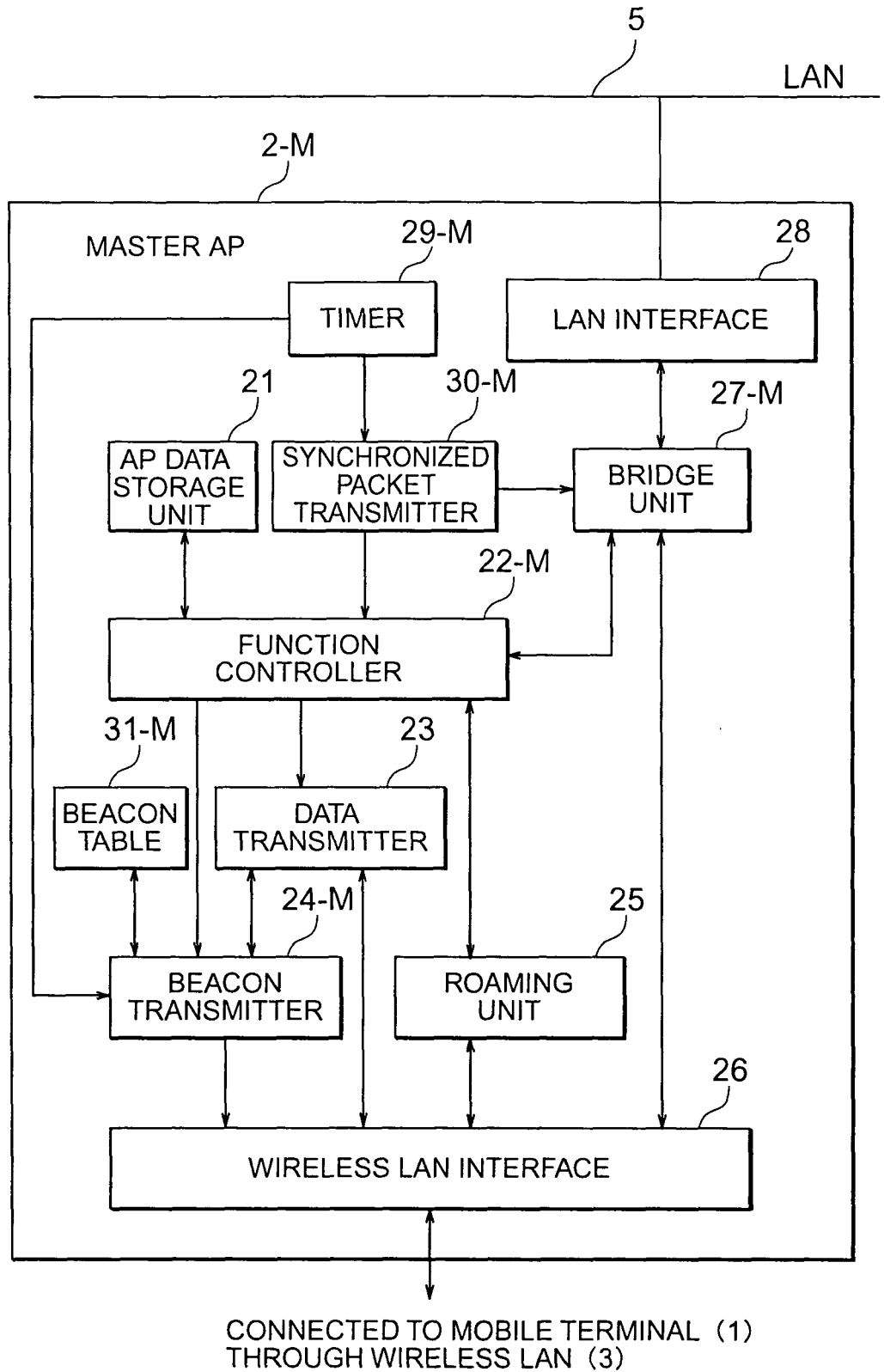
FIG. 21 is a diagram showing the functional block arrangement of the master AP in FIG. 20.

As shown in FIG. 21, in addition to the arrangement in FIG. 5, the master AP 2-M includes a timer 29-M, a synchronized packet transmitter 30-M for transmitting a synchronized packet, and a beacon table 31-M.

Figure 22:
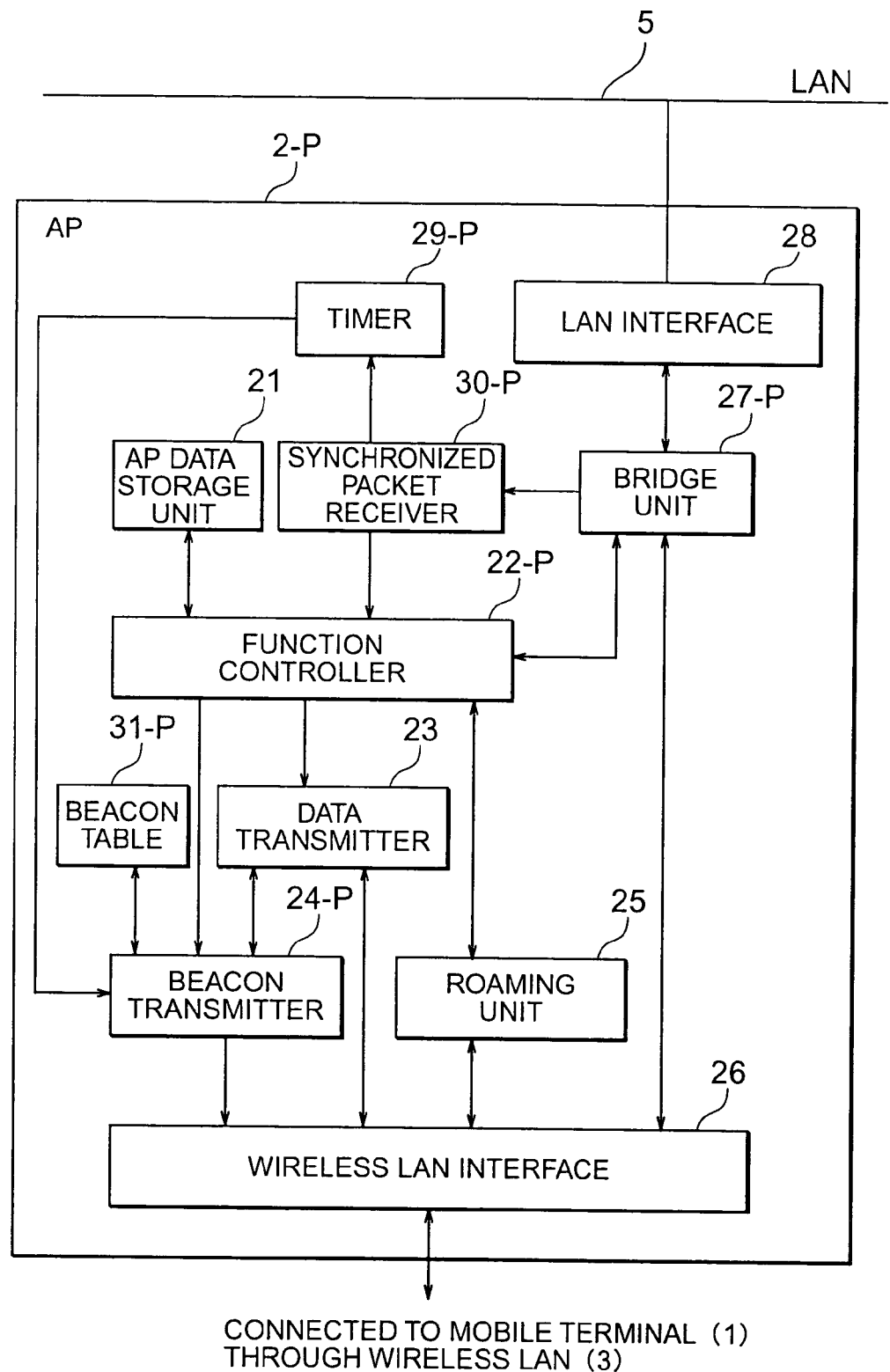
FIG. 22 is a diagram showing the functional block arrangement of an AP other than the master AP in FIG. 20.

As shown in FIG. 22, in addition to the arrangement in FIG. 5, each of the APs 2-P includes a timer 29-P corresponding to that of the master AP 2-M, a synchronized packet receiver 30-P for receiving a synchronized packet, and a beacon table 31-P.

At the timing of transmission of a beacon signal, the master AP 2-M also transmits, to each AP 2-P, a synchronized packet that includes the time stamp indicating the timing. The synchronized packet may be transmitted by multi-casting or broadcasting, or may be transmitted to a predetermined AP 2-P.

The synchronized packet receiver 30-P of the AP 2-P receives the synchronized packet from the master AP 2-M, and adjusts the time of the timer 29-P to the time stamp included in the synchronized packet. Through this process, the timers 29-M and 29-P of all the APs connected to the LAN 5 are synchronized.

Figures 23, 24:
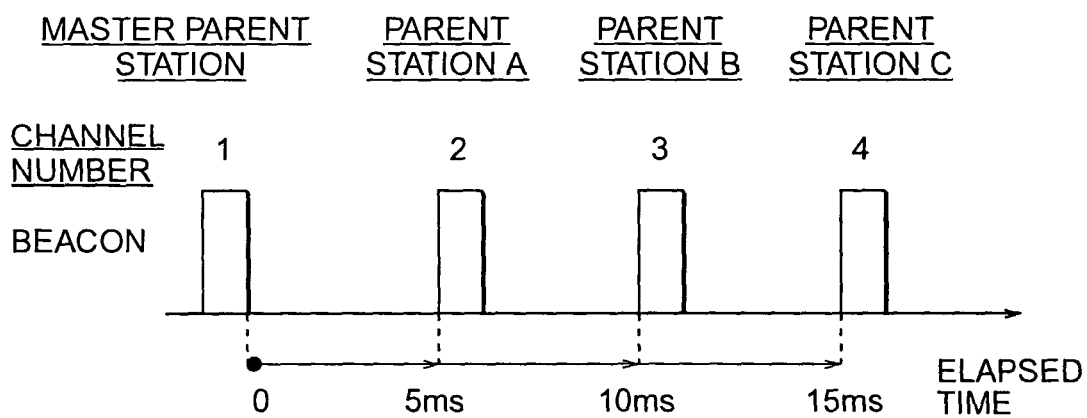
FIG. 23 is a diagram showing the contents of a beacon timing table provided for each component in FIG. 20.
FIG. 24 is a diagram showing example beacon timings in FIG. 20.

FIG. 23 is a beacon timing table showing the correlation between the wireless channel of each AP 2-P and the time added to the time (hereinafter referred to a reference time) whereat the synchronized packet was received. The beacon timing table is prepared in a beacon table for each AP 2-P and a mobile terminal 1-P. Each of the AP 2-P adds, to the reference time, a predetermined time corresponding to the wireless channel of the pertinent AP 2-P, and transmits a beacon signal.

A specific example for this process is shown in FIG. 24.

As shown in FIGS. 21 and 22, a channel number "1" represents a delay time relative to the master AP 2-M, and the delay times for a channel number "2" and the following numbers are shifted by 5 ms in the ascending order. Therefore, the AP 2-P transmits the beacon signal with a delay from a reference time by a length indicated by the pertinent channel.

With this configuration, when the synchronized packet is not received by the AP 2-P, the AP 2-P transmits a beacon signal at a predetermined timing, and corrects the transmission time when the synchronized packet is received. In this manner, the timing for transmission of the beacon signal from each AP 2-P can be managed for each channel. Therefore, the transmission timings for the beacon signals can be distributed to prevent the beacon signals of the APs from being overlapped.

In this embodiment, the correlation between the wireless channel and the beacon transmission timing is employed. However, the transmission timing may be determined by another method.

The passive scanning process performed by a mobile terminal 1-H will now be described while referring to FIGS. 25 and 26.

Since beacon signals are transmitted independently from multiple APs at the respective timings, the beacon reception through the passive search is not efficient, and a long search period is required. However, with the configuration of the embodiment, since the timing of transmission of a beacon signal can be identified, the beacon reception efficiency is improved, and the period required for the passive search by the parent station can be reduced. This configuration will now be described.

Figure 25:
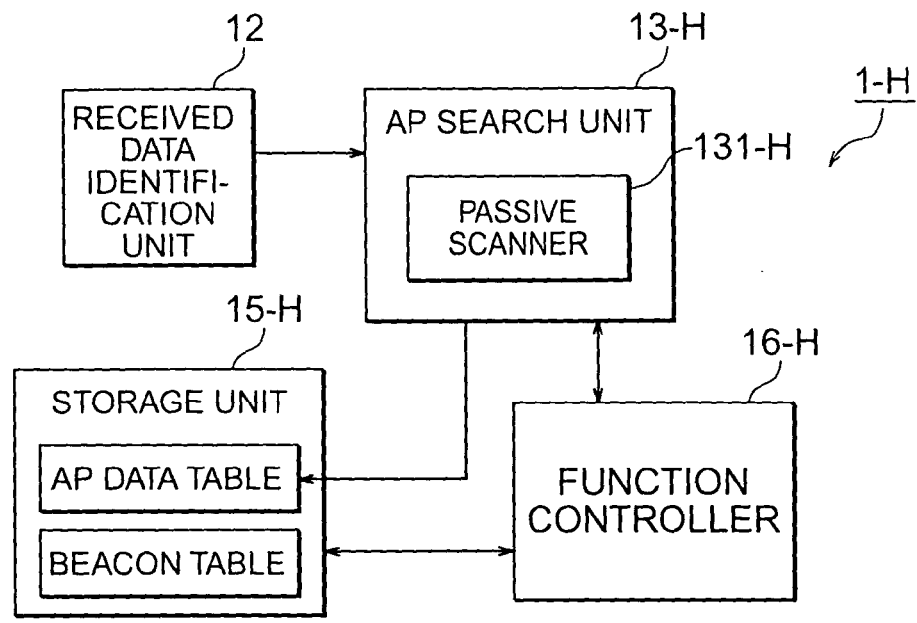
FIG. 25 is a diagram showing part of the functional block arrangement of the mobile terminal in FIG. 4 for which a passive scanner is additionally provided.

As shown in FIG. 25, in the mobile terminal 1-H, a passive scanner 131-H is additionally provided for an AP search unit 13-H, and a beacon table where passive scan timings are registered in advance is prepared for a storage unit 15-H. The beacon table may be incorporated in the AP search unit 13-H.

The mobile terminal 1-H employs the channel of the currently connected parent station AP and the beacon timing table shown in FIG. 23 to obtain the time whereat it is predicted that the beacon signal is transmitted by another peripheral AP. The mobile terminal 1-H then examines the time and the channel to perform the passive search process.

Since the channel and the transmission time for each AP to be searched for can be identified, the beacon signal can be efficiently received by a short passive search. That is, the beacon reception efficiency is improved, and the passive search period for finding the peripheral APs can be reduced.

Figure 26:
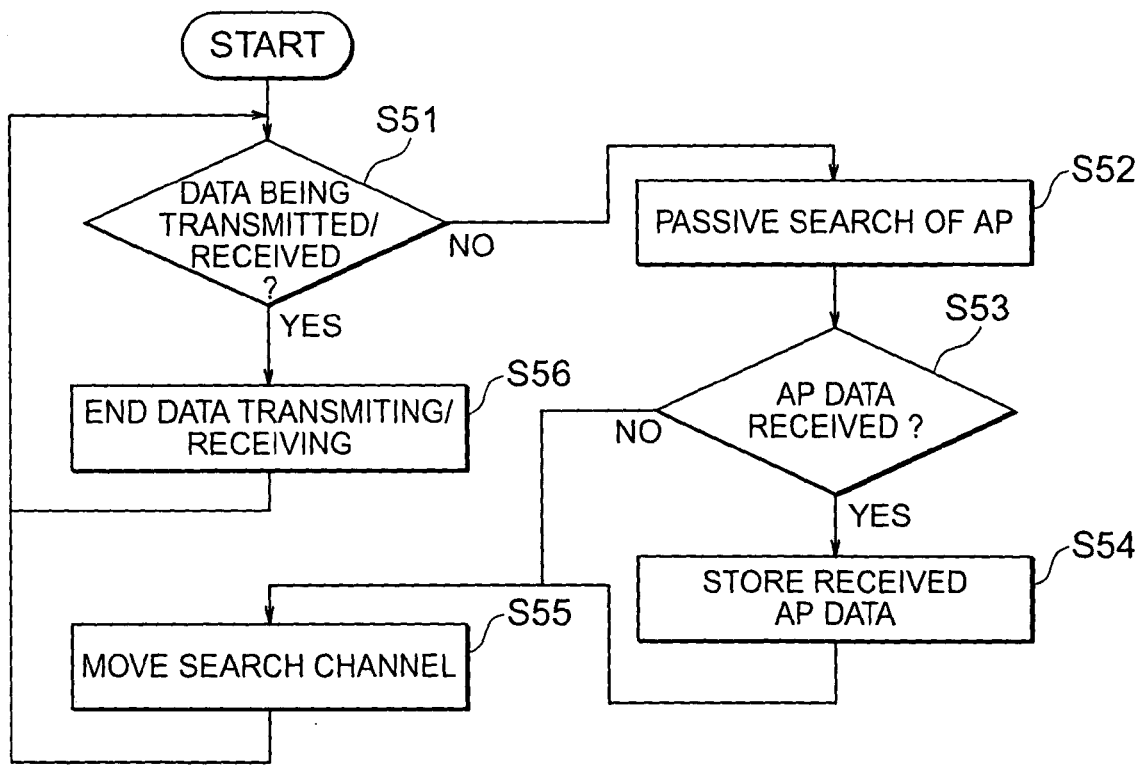
FIG. 26 is a flowchart showing the passive scanning processing performed by the mobile terminal in FIG. 25.

While referring to FIG. 26, when the mobile terminal 1-H does not perform any transmission and reception of data at the above timing (NO at step S51), the mobile terminal 1-H performs the passive search for a predetermined period of time (step S52). For example, as shown in FIG. 23, since the beacon signals are transmitted with a delay of every 5 ms for the individual channels, the search period is within 5 ms.

When the mobile terminal 1-H has found the peripheral AP through the search and has received the AP data (YES at step S53), the mobile terminal 1-H stores the AP data in the AP data table of the storage unit 15-H (step S54). And the mobile terminal 1-H changes and shifts to the next search channel for the passive search (step S55). Program control thereafter returns to step S51, and the passive search is performed for the different channel. When the decision is NO at step S53, i.e., when the peripheral AP is not found for the channel, program is shifted to step S55, and the mobile terminal 1-H changes or shifted to another channel to perform the passive search. When the decision is NO at step S51, i.e., when transmitting and receiving of the data are currently performed, the mobile terminal 1-H waits until the transmitting and receiving of the data is completed (step S56).

With this configuration, the mobile terminal 1-H continues the passive search when the data transmission (transmitting or receiving) is not performed, and can store the AP data for the peripheral APs. Further, since the efficiency that the connectable peripheral AP is found through the passive search is increased, a search packet need not be transmitted through the active search, and the data for the peripheral AP can be obtained before the roaming. That is, since the passive search is performed for each wireless channel for every predetermined time since the beacon signal is received from the currently connected parent station AP, the beacon signals can be correctly received from the other peripheral APs in a short period of time.

Figure 27:
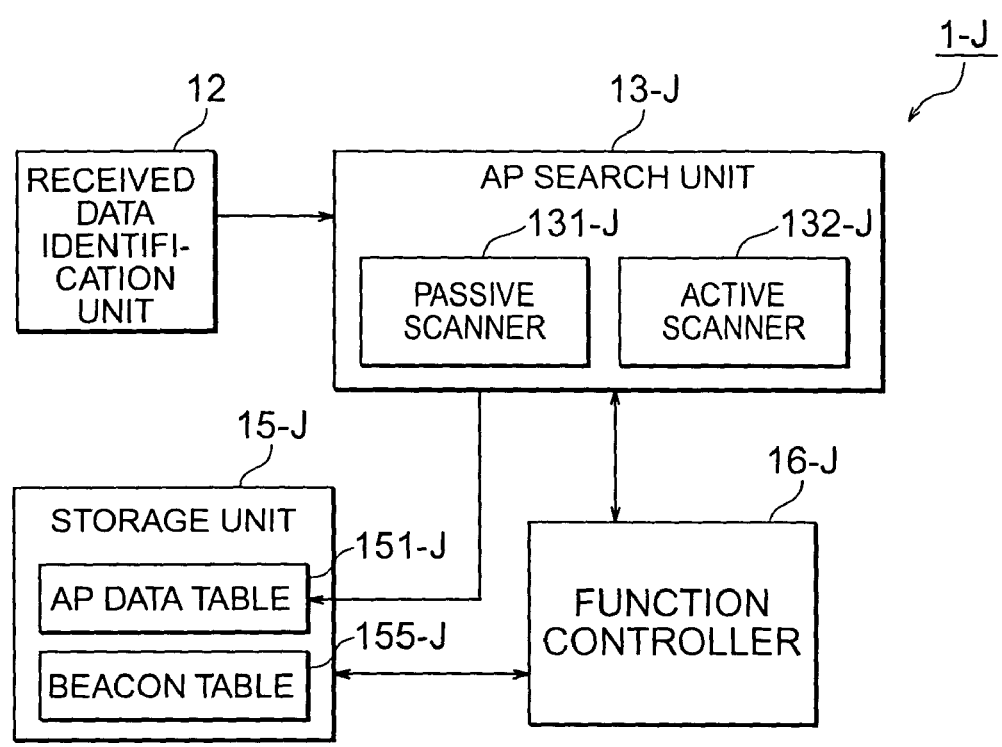
FIG. 27 is a diagram showing part of the functional block arrangement of the mobile terminal in FIG. 25 for which an active scanner is additionally provided.

A mobile terminal 1-J that differs from the mobile terminal 1-H will now be described while referring to FIG. 27.

A difference of the mobile terminal 1-J from the mobile terminal 1-H is that a passive scanner 131-J of an AP search unit 13-J additionally includes an active scanner 132-J.

In the mobile terminal 1-J as well as the mobile terminal 1-H, the passive scanner 131-J searches for peripheral APs. However, when the connectable peripheral APs are not yet found within a predetermined period of time or after the roaming is initiated, the active scanner 132-J performs the active scanning to find the peripheral APs.

As a result, the AP search is performed without adversely affecting the network, and the AP data are stored in an AP data table 151-J. Since the active scanning is performed when the peripheral AP can not be detected through the passive search, the accuracy for finding the peripheral AP can be more increased.

In the above explanation, the functional blocks and the processing shown in the drawings have been employed. However, so long as these functions are satisfied, the functions may be divided or combined, or the steps in the processing may be inverted. In addition, the present invention is not limited to the fast roaming system of this embodiment, and can also be applied for the operation of the general mobile communication terminal, including the selection of a first connectable peripheral AP.

As described above, according to the invention, in response to the search performed by the mobile terminal, each AP transmits, directly to the mobile terminal, the AP data required for the roaming. While the mobile terminal performs the passive scanning search or the active scanning search in a short period of time, and obtains and stores the latest AP data in the AP data table. As a result, only the latest data for the connectable peripheral AP that is a roaming destination can be stored in the AP data table. Therefore, even if the roaming start condition is established and then the mobile terminal changes the connection to the roaming destination AP that is first selected based on the AP data table, the probability that the switching of the access point can be completed, and only a short switching period is required. That is, the first effect is that the mobile terminal can change the access point by roaming at a high probability and in a short period of time.

As described above, according to the invention, the order condition for selecting the roaming destination AP is set in advance by the mobile terminal. That is, when the order condition is the selection beginning with the highest reception level, the AP closest to the mobile terminal can be selected, so that the number of roaming times can be reduced. When the order condition is the selection beginning with the number of mobile terminals connected to the AP, the load imposed on the AP can be distributed. When the order condition is the selection beginning with the smallest error ratio, the AP providing a better communication environment can be selected. Further, when the AP data are weighted based on the order and the entry type, the AP providing a better communication environment can be selected for connection. That is, the second effect is that an AP providing a better communication environment and a higher communication quality can be selected, and the load imposed on the AP can be distributed and be reduced.

As described above, according to the invention, the mobile terminal collects the levels of signals received from the currently connected parent station AP, and initiates the roaming process only when the reduction of the reception level is continued. A third effect is that the unnecessary roaming process can be avoided when the reception level is temporarily degraded during communication.

As described above, since the mobile terminal collects the AP data not only for the peripheral APs but also the currently connected parent station AP, the mobile terminal can select, as the roaming destination, a peripheral AP for which the AP data are more satisfactory than those for the parent station AP. A fourth effect is that, during the communication, the mobile terminal can change the connection to a peripheral AP providing a better communication environment.

What is claimed is:

1. A fast roaming system comprising at least one mobile terminal and at least two access points,
   wherein the at least one mobile terminal, while communicating over a wireless LAN with an access point of the at least two access points, serving as a parent station, can be quickly switched from the parent station to an adjacent access point of the at least two access points having an overlapping communication range;
   wherein each of the at least two access points comprises:
       a wireless LAN interface for communicating with the mobile terminal over the wireless LAN,
       a roaming unit for performing a roaming operation,
       a beacon transmitter for transmitting a beacon signal to provide synchronization with the mobile terminal, and
       a data transmitter for transmitting, to the mobile terminal, access point data required for the roaming operation; and
   wherein the mobile terminal comprises:
       a wireless LAN interface for communicating with an access point over the wireless LAN,
       an access point search unit for searching for peripheral connectable access points and for obtaining access point data,
       a roaming execution unit for transferring the connection of the mobile terminal from a currently connected access point to another, designated access point,
       an access point data table in which the access point data detected and obtained by the access point search unit are recorded, and
       a function controller for, when a condition for communicating with the currently connected access point matches a predetermined roaming operation start condition, employing a predetermined order sequence to select one of the access points entered into the access point data table, and for driving the roaming unit to perform the roaming operation for the access point that is selected.

2. A fast roaming system according to claim 1, wherein the mobile terminal provides a roaming order as the order condition for the access point that is recorded in the access point data table; and wherein, until a roaming process is completed, the function controller repeats the roaming process in the roaming order to sequentially select a roaming destination.

3. A fast roaming system according to claim 2, wherein the mobile terminal monitors a reception level of a wireless signal received from a connectable access point, stores the reception level to the access point data table, and sets the roaming order beginning with the highest reception level.

4. A fast roaming system according to claim 2, wherein the data transmitter of each of the at least two access points transmits, to the mobile terminal, the number of mobile terminals connected to the access point; and wherein the access point search unit of the mobile terminal stores, in the access point data table, the number of mobile terminals that is received, and sets the roaming order beginning with the smallest number of the mobile terminals connected to the access point.

5. A fast roaming system according to claim 2, wherein the data transmitter of each of the at least two access points transmits, to the mobile terminal, an error ratio of data that are exchanged; and wherein the access point search unit of the mobile terminal stores the received error ratio in the access point data table, and sets the roaming order beginning with the lowest error ratio.

6. A fast roaming system according to claim 2, wherein the data transmitter of each of the at least two access points transmits, to the mobile terminal, a communication ratio for a communication band of the access point; and wherein the access point search unit of the mobile terminal stores the received communication ratio in the access point data table, and sets the roaming order beginning with the lowest communication ratio.

7. A fast roaming system according to claim 2,
   wherein the data transmitter of each of the at least two access points transmits, to the mobile terminal, traffic data that include the number of mobile terminals connected to the access point, the error ratio of data that are exchanged, and the communication ratio for the communication band of the access point;
   wherein the access point search unit of the mobile terminal stores the number of mobile terminals, the error ratio and the communication ratio in the access point data table; and
   wherein the function controller of the mobile terminal adds predetermined weights to multiple entries in the access point data table, including the number of mobile terminals, the error ratio and the communication ratio, obtains the sums for the individual access points, and sets the roaming order beginning with the smallest sum.

8. A fast roaming system according to claim 1, wherein the mobile terminal further comprises:
   a reception level area, in the access point data table, for which, during communication, reception levels of wireless signals received from the parent station that is an access point are monitored and stored sequentially at predetermined times;
   a level comparator for comparing the reception level of each received wireless signal with reception levels in the past;
   a counter for counting the times for comparison; and
   a roaming start instruction unit for defining, as the predetermined roaming start condition, when the result of the comparison, the reception level is lowered continuously by the number of times that matches a predetermined count.

9. A fast roaming system according to claim 8, wherein the mobile terminal further includes:
a roaming start instruction unit for comparing, with the reception levels of signals received from the connected parent station, a reception level of a wireless signal obtained by the access point search unit, and for defining, as the roaming start, when the reception level of the signal obtained by the access point search unit is a predetermined value or larger.

10. A fast roaming system according to claim 1, wherein the mobile terminal further includes:
a roaming start instruction unit for extracting an error ratio included in a beacon signal received from the connected parent station, and storing the error ratio, and for defining, as the roaming start, when the error ratio is larger than a predetermined error ratio.

11. A fast roaming system according to claim 1,
wherein the access point search unit of the mobile terminal obtains the end time of a contention-free period, which are included in both a beacon signal and a probe response; and
wherein, the access point search unit searches for peripheral access points during a period except for a period where data are transmitted and received, after the contention-free period is over.

12. A fast roaming system according to claim 1, wherein one selected access point is located as a master parent station for transmitting a synchronized packet; and wherein the master parent station comprises:
a synchronized packet transmitter for transmitting, to another access point, a synchronized packet that is synchronized with a beacon signal transmitted by the master parent station; and wherein each of the other access points includes:
a synchronized packet receiver for receiving the synchronized packet; and
a beacon transmitter for defining, as a reference time, the reception time for the synchronized packet, and for, after a predetermined time has elapsed following the reception of the reference time, transmitting a beacon signal, without overlapping a beacon signal from another access point.

13. A fast roaming system according to claim 12, wherein the access point search unit of the mobile terminal comprises:
a passive scanner for receiving a beacon signal and for searching for an access point; and
a beacon table, in which the correlation between a wireless channel and a beacon transmission time is recorded,
wherein the passive scanner performs the passive scanning at the time recorded in the beacon table, excluding the time whereat the mobile terminal is transmitting and receiving data.

14. A fast roaming system according to claim 13, wherein the mobile terminal further comprises:
an active scanner for examining an access point from which a response is received relative to a search packet that the access point search unit has transmitted to the access point,
wherein, when the passive scanner fails to obtain the access point through passive scanning, the active scanner performs the active scanning.

15. A fast roaming system according to claim 1, wherein the access point search unit obtains the access point data from the peripheral connectable access points.

16. A mobile terminal capable of performing fast roaming, wherein the mobile terminal, while communicating over a wireless LAN with an access point can be quickly switched from the access point with which there is communication to an adjacent access point having an overlapping communication range; and
wherein the mobile terminal comprises:
a wireless LAN interface for communicating with an access point over the wireless LAN,
an access point search unit for searching for peripheral connectable access points and for obtaining access point data,
a roaming execution unit for transferring the connection of the mobile terminal from a currently connected access point to another, designated access point,
an access point data table in which the access point data detected and obtained by the access point search unit are recorded, and
a function controller for, when a condition for communicating with the currently connected access point matches a predetermined roaming operation start condition, employing a predetermined order sequence to select one of the access points entered into the access point data table, and for driving the roaming unit to perform the roaming operation for the access point that is selected.

17. A mobile terminal according to claim 16, wherein the mobile terminal provides a roaming order as the order condition for the access point that is recorded in the access point data table; and wherein, until a roaming process is completed, the function controller repeats the roaming process in the roaming order to sequentially select a roaming destination.

18. A mobile terminal according to claim 17, wherein the mobile terminal monitors a reception level of a wireless signal received from a connectable access point, stores the reception level to the access point data table, and sets the roaming order beginning with the highest reception level.

19. A mobile terminal according to claim 17, wherein the mobile terminal receives from each of the access points the number of mobile terminals connected to the access point; and wherein the access point search unit of the mobile terminal stores, in the access point data table, the number of mobile terminals that is received, and sets the roaming order beginning with the smallest number of the mobile terminals connected to the access point.

20. A mobile terminal according to claim 17, wherein the mobile terminal receives from each of the access points an error ratio of data that are exchanged; and wherein the access point search unit of the mobile terminal stores the received error ratio in the access point data table, and sets the roaming order beginning with the lowest error ratio.

21. A mobile terminal according to claim 17, wherein the mobile terminal receives from each of the access points a communication ratio for a communication band of the access point; and wherein the access point search unit of the mobile terminal stores the received communication ratio in the access point data table, and sets the roaming order beginning with the lowest communication ratio.

22. A mobile terminal according to claim 17,
wherein the mobile terminal receives from each of the access points traffic data that include the number of mobile terminals connected to the access point, the error ratio of data that are exchanged, and the communication ratio for the communication band of the access point;

wherein the access point search unit of the mobile terminal stores the number of mobile terminals, the error ratio and the communication ratio in the access point data table; and wherein the function controller of the mobile terminal adds predetermined weights to multiple entries in the access point data table, including the number of mobile terminals, the error ratio and the communication ratio, obtains the sums for the individual access points, and sets the roaming order beginning with the smallest sum.

23. A mobile terminal according to claim 16, wherein the mobile terminal further comprises:
- a reception level area, in the access point data table, for which, during communication, reception levels of wireless signals received from a parent station that is an access point are monitored and stored sequentially at predetermined times;
- a level comparator for comparing the reception level of each received wireless signal with reception levels in the past;
- a counter for counting the times for comparison; and
- a roaming start instruction unit for defining, as the predetermined roaming start condition, when the result of the comparison, the reception level is lowered continuously by the number of times that matches a predetermined count.

24. A mobile terminal according to claim 23, wherein the mobile terminal further includes:
- a roaming start instruction unit for comparing, with the reception levels of signals received from a connected parent station, that is an access point, a reception level of a wireless signal obtained by the access point search unit, and for defining, as the roaming start, when the reception level of the signal obtained by the access point search unit is a predetermined value or larger.

25. A mobile terminal according to claim 16, wherein the mobile terminal further includes:
- a roaming start instruction unit for extracting an error ratio included in a beacon signal received from a connected parent station, that is an access point, and storing the error ratio, and for defining, as the roaming start, when the error ratio is larger than a predetermined error ratio.

26. A mobile terminal according to claim 16,
wherein the access point search unit of the mobile terminal obtains the end time of a contention-free period, which are included in both a beacon signal and a probe response; and
wherein, the access point search unit searches for peripheral access points during a period except for a period where data are transmitted and received, after the contention-free period is over.

27. A mobile terminal according to claim 16, wherein the access point search unit of the mobile terminal comprises:
- a passive scanner for receiving a beacon signal and for searching for an access point; and
- a beacon table, in which the correlation between a wireless channel and a beacon transmission time is recorded,
- wherein the passive scanner performs the passive scanning at the time recorded in the beacon table, excluding the time whereat the mobile terminal is transmitting and receiving data.

28. A mobile terminal according to claim 27, wherein the mobile terminal further comprises:
- an active scanner for examining an access point from which a response is received relative to a search packet that the access point search unit has transmitted to the access point,
- wherein, when the passive scanner fails to obtain the access point through passive scanning, the active scanner performs the active scanning.

29. A mobile terminal according to claim 16, wherein the access point search unit obtains the access point data from the peripheral connectable access points.

* * * * *